(12) United States Patent
Masubuchi et al.

(10) Patent No.: US 11,486,322 B2
(45) Date of Patent: Nov. 1, 2022

(54) EXHAUST PURIFICATION DEVICE OF INTERNAL COMBUSTION ENGINE AND CATALYST

(71) Applicant: TOYOTA JIDOSHA KABUSHIKI KAISHA, Aichi-ken (JP)

(72) Inventors: Masahiko Masubuchi, Mishima (JP); Toshihiro Mori, Gotemba (JP); Hiroshi Kobayashi, Numazu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/344,957

(22) Filed: Jun. 11, 2021

(65) Prior Publication Data
US 2021/0388785 A1    Dec. 16, 2021

(30) Foreign Application Priority Data

Jun. 12, 2020 (JP) .............................. JP2020-102519
Nov. 12, 2020 (JP) .............................. JP2020-188594

(51) Int. Cl.
  *F02D 41/02* (2006.01)
  *F01N 3/20* (2006.01)
  *F01N 3/28* (2006.01)

(52) U.S. Cl.
  CPC ....... *F02D 41/0235* (2013.01); *F01N 3/2066* (2013.01); *F01N 3/28* (2013.01)

(58) Field of Classification Search
  CPC ...... F02D 41/0235; F01N 3/2066; F01N 3/28; F01N 3/225; F01N 9/00; Y02T 10/40

USPC .......................................................... 60/299
See application file for complete search history.

(56) References Cited

U.S. PATENT DOCUMENTS

| | | | |
|---|---|---|---|
| 2018/0023437 A1* | 1/2018 | Suzuki | F02D 41/025 60/274 |
| 2018/0073458 A1* | 3/2018 | Hayashita | F02D 41/1456 |
| 2018/0202336 A1* | 7/2018 | Kaneko | F02D 41/1475 |
| 2018/0283302 A1* | 10/2018 | Hayashita | F02D 41/1445 |
| 2018/0283304 A1* | 10/2018 | Yoda | F02D 41/1446 |
| 2020/0256235 A1* | 8/2020 | Kadota | F01N 3/2803 |
| 2020/0271067 A1* | 8/2020 | Lee | B01D 53/945 |

FOREIGN PATENT DOCUMENTS

JP        2007239698 A        9/2007

* cited by examiner

*Primary Examiner* — Brandon D Lee
(74) *Attorney, Agent, or Firm* — Hauptman Ham, LLP

(57) ABSTRACT

The exhaust purification device of an internal combustion engine comprises a catalyst 20 arranged in an exhaust passage and able to store oxygen; and an air-fuel ratio control device configured to control an air-fuel ratio of inflowing exhaust gas flowing into the catalyst. The air-fuel ratio control device is configured to perform a distribution forming control controlling the air-fuel ratio of the inflowing exhaust gas so that in the catalyst, a first region with an oxygen storage amount of equal to or greater than a predetermined value and a second region with an oxygen storage amount of less than the predetermined value are alternately formed along an axial direction of the catalyst. The total number of the first region and the second region formed by the distribution forming control is equal to or greater than three.

12 Claims, 18 Drawing Sheets

EXHAUST PURIFICATION DEVICE OF INTERNAL COMBUSTION ENGINE AND CATALYST

RELATED APPLICATIONS

The present application claims priority of Japanese Patent Application Nos. 2020-102519 filed Jun. 12, 2020 and 2020-188594 filed Nov. 12, 2020, the disclosures of which applications are hereby incorporated by reference herein in their entirety.

FIELD

The present invention relates to an exhaust purification device of an internal combustion engine and a catalyst.

BACKGROUND

It has been known in the past to place a catalyst able to store oxygen in an exhaust passage of an internal combustion engine and remove the HC, CO, NOx, etc., in the exhaust gas at the catalyst.

In such a catalyst, if the precious metal of the catalyst becomes an inert state due to poisoning by oxygen or HC, the exhaust purification performance of the catalyst falls. As opposed to this, in the internal combustion engine described in Japanese Unexamined Patent Publication No. 2007-239698, perturbation control is performed forcibly making the air-fuel ratio of the air-fuel mixture fluctuate about an air-fuel ratio richer than the stoichiometric air-fuel ratio. In Japanese Unexamined Patent Publication No. 2007-239698, it is described that the precious metal of the catalyst can be activated by repeating storage and release of oxygen at the catalyst by the perturbation control and in turn the exhaust purification performance of the catalyst can be improved.

CITATIONS LIST

Patent Literature

[PTL 1] Japanese Unexamined Patent Publication No. 2007-239698

SUMMARY

Solution to Problem

However, in the technique described in Japanese Unexamined Patent Publication No. 2007-239698, there is room for improvement of the local exhaust purification performance in the catalyst. Further, along with stricter exhaust gas regulations, further improvement of the exhaust purification performance of the catalyst is desirable.

Therefore, in consideration of the above technical problem, an object of the present invention is to improve an exhaust purification performance of a catalyst arranged in an exhaust passage of an internal combustion engine.

Solution to Problem

The summary of the present disclosure is as follows.

(1) An exhaust purification device of an internal combustion engine comprising: a catalyst arranged in an exhaust passage and able to store oxygen; and an air-fuel ratio control device configured to control an air-fuel ratio of inflowing exhaust gas flowing into the catalyst, wherein the air-fuel ratio control device is configured to perform a distribution forming control controlling the air-fuel ratio of the inflowing exhaust gas so that in the catalyst, a first region with an oxygen storage amount of equal to or greater than a predetermined value and a second region with an oxygen storage amount of less than the predetermined value are alternately formed along an axial direction of the catalyst, and a total number of the first region and the second region formed by the distribution forming control is equal to or greater than three.

(2) The exhaust purification device of the internal combustion engine described in above (1), wherein the air-fuel ratio control device is configured to perform the distribution forming control so that at least one of boundaries between the first region and the second region is formed at a downstream side of the catalyst and at least one of the boundaries is formed at an upstream side of the catalyst.

(3) The exhaust purification device of the internal combustion engine described in above (1) or (2), wherein the total number of the first region and the second region formed by the distribution forming control is equal to or greater than four.

(4) The exhaust purification device of the internal combustion engine described in above any one of (1) to (3), wherein in the distribution forming control, the air-fuel ratio control device is configured to alternately perform a rich air-fuel ratio control making the air-fuel ratio of the inflowing exhaust gas richer than a stoichiometric air-fuel ratio and a lean air-fuel ratio control making the air-fuel ratio of the inflowing exhaust gas leaner than the stoichiometric air-fuel ratio so that an amount of fluctuation of oxygen of the catalyst during each air-fuel ratio control gradually becomes smaller.

(5) The exhaust purification device of the internal combustion engine described in above (4), wherein in the distribution forming control, the air-fuel ratio control device is configured to alternately perform the rich air-fuel ratio control and the lean air-fuel ratio control so that a difference between a target air-fuel ratio of the inflowing exhaust gas and the stoichiometric air-fuel ratio in each air-fuel ratio control gradually becomes smaller.

(6) The exhaust purification device of the internal combustion engine described in above (4), wherein in the distribution forming control, the air-fuel ratio control device is configured to alternately perform the rich air-fuel ratio control and the lean air-fuel ratio control so that a time period of performance of each air-fuel ratio control gradually becomes shorter.

(7) The exhaust purification device of the internal combustion engine described in above (4), wherein in the distribution forming control, the air-fuel ratio control device is configured to alternately perform the rich air-fuel ratio control and the lean air-fuel ratio control so that a difference between a target air-fuel ratio of the inflowing exhaust gas and the stoichiometric air-fuel ratio in each air-fuel ratio control gradually becomes smaller and a time period of performance of each air-fuel ratio control gradually becomes shorter.

(8) The exhaust purification device of the internal combustion engine described in above (4) or (5), wherein the air-fuel ratio control device is configured to calculate an amount of feed of a reducing agent to the catalyst during the rich air-fuel ratio control and end the rich air-fuel ratio control when the amount of feed of the reducing agent has reached a predetermined amount, and calculate an amount of feed of an oxygen to the catalyst during the lean air-fuel ratio control and end the lean air-fuel ratio control when the amount of feed of the oxygen has reached a predetermined amount.

(9) The exhaust purification device of the internal combustion engine described in any one of above (4) to (8), wherein the air-fuel ratio control device is configured to calculate a degree of deterioration of the catalyst and set a target air-fuel ratio of the inflowing exhaust gas during the rich air-fuel ratio control and a target air-fuel ratio of the inflowing exhaust gas during the lean air-fuel ratio control based on the degree of deterioration.

(10) The exhaust purification device of the internal combustion engine described in any one of above (1) to (9), wherein the air-fuel ratio control device is configured to control the air-fuel ratio of the inflowing exhaust gas so that positions of the first region and the second region formed at the catalyst by the distribution forming control are reversed, if repeatedly performing the distribution forming control.

(11) A catalyst arranged in an exhaust passage of an internal combustion engine and able to store oxygen, wherein a first region with an oxygen storage amount of equal to or greater than a predetermined value and a second region with an oxygen storage amount of less than the predetermined value are alternately formed along an axial direction of the catalyst, and a total number of the first region and the second region is equal to or greater than three.

Advantageous Effects of Invention

According to the present invention, it is possible to improve an exhaust purification performance of a catalyst arranged in an exhaust passage of an internal combustion engine.

DESCRIPTION OF EMBODIMENTS

Figure 1:
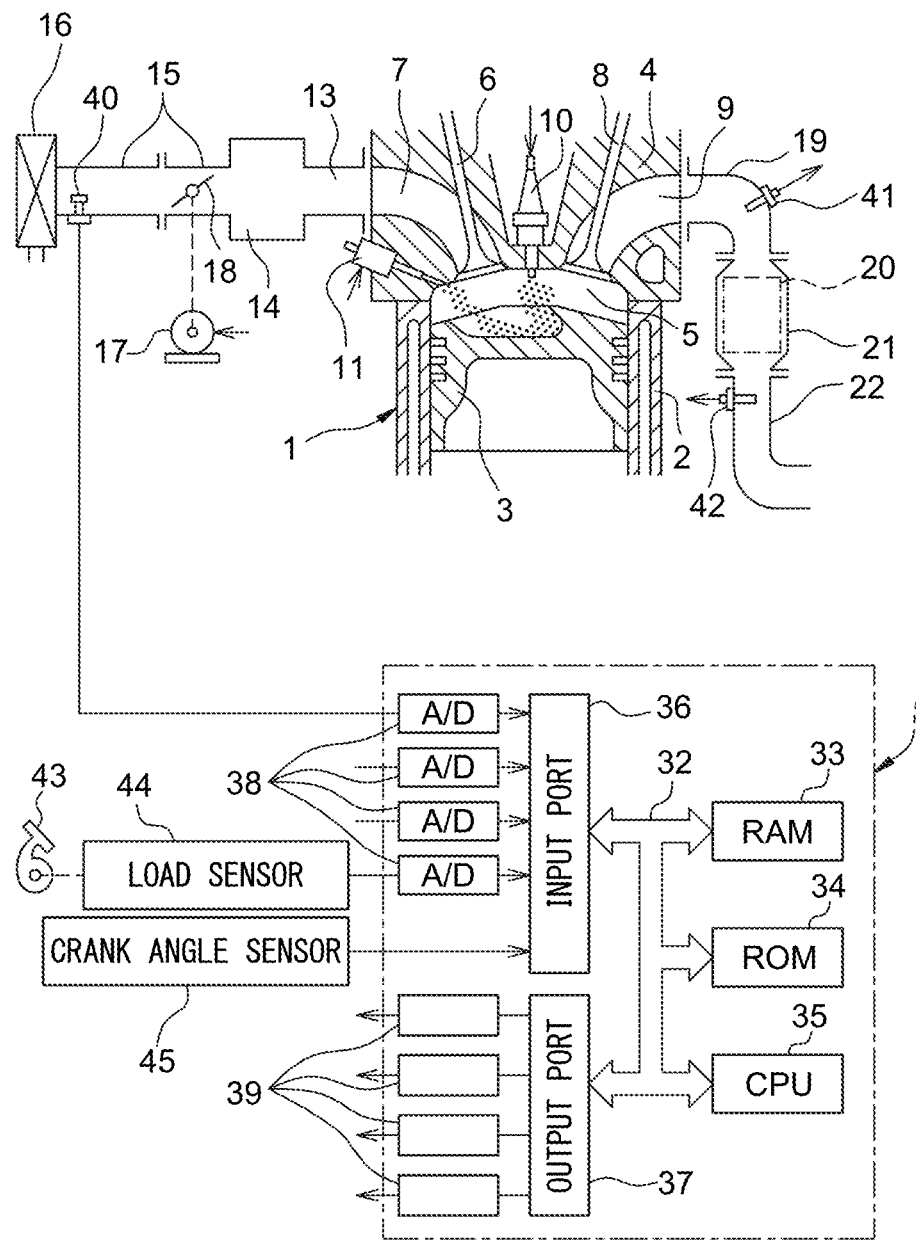
FIG. 1 is a view schematically showing an internal combustion engine in which an exhaust purification device of an internal combustion engine according to a first embodiment of the present invention is provided.

Below, referring to the figures, embodiments of the present invention will be explained in detail. Note that, in the following explanation, similar components are assigned the same reference numerals.

First Embodiment

First, referring to FIG. 1 to FIG. 6B, a first embodiment of the present invention will be explained.

<Explanation of Internal Combustion Engine Overall>

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 1 indicates an engine body, 2 a cylinder block, 3 a piston which reciprocates inside the cylinder block 2, 4 a cylinder head which is fastened to cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to a casing 21 which has a catalyst 20 built into it. The casing 21 is connected to an exhaust pipe 22. The exhaust port 9, the exhaust manifold 19, the casing 21, the exhaust pipe 22, etc., form an exhaust passage which discharges exhaust gas produced due to combustion of the air-fuel mixture in the combustion chamber 5.

Various control routines of the internal combustion engine are performed by an electronic control unit (ECU) 31. Outputs of various sensors provided in the internal combustion engine or the vehicle equipped with the internal combustion engine are entered into the ECU 31, and the ECU 31 controls various actuators based on the outputs of the sensors, etc.

The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. Note that, in the present embodiment, a single ECU 31 is provided, but a plurality of ECUs may be provided for each function.

In the intake pipe 15, an air flow meter 40 detecting the flow rate of air which flows through the intake pipe 15 is arranged. The output of the air flow meter 40 is input through a corresponding AD converter 38 to the input port 36.

Further, at the header of the exhaust manifold 19, i.e., at the exhaust passage at the upstream side of the catalyst 20 in the exhaust flow direction, an upstream side air-fuel ratio sensor 41 detecting the air-fuel ratio of the exhaust gas which flows through the inside of the exhaust manifold 19 (that is, the exhaust gas which is discharged from the combustion chamber 5 of the internal combustion engine and flows into the catalyst 20) is arranged. The output of the upstream side air-fuel ratio sensor 41 (output current) becomes larger proportionally to the air-fuel ratio of the exhaust gas, and the upstream side air-fuel ratio sensor 41 can continuously (linearly) detect the air-fuel ratio of the exhaust gas. The output of the upstream side air-fuel ratio sensor 41 is input through the corresponding AD converter 38 to the input port 36.

Further, in the exhaust pipe 22, i.e., at the exhaust passage at the downstream side of the catalyst 20 in the exhaust flow direction, a downstream side air-fuel ratio sensor 42 detecting the air-fuel ratio of the exhaust gas which flows through the inside of the exhaust pipe 22 (that is, the exhaust gas flowing out from the catalyst 20) is arranged. The output of the downstream side air-fuel ratio sensor 42 (output current) becomes larger proportionally to the air-fuel ratio of the exhaust gas, and the downstream side air-fuel ratio sensor 42 can continuously (linearly) detect the air-fuel ratio of the exhaust gas. The output of the downstream side air-fuel ratio sensor 42 is input through the corresponding AD converter 38 to the input port 36.

Further, a load sensor 44 generating an output voltage proportional to the amount of depression of an accelerator pedal 43 is connected to the accelerator pedal 43 provided in the vehicle mounting the internal combustion engine. The output voltage of the load sensor 44 is input to the input port 36 through a corresponding AD converter 38. The ECU 31 calculates the engine load based on the output of the load sensor 44.

Further, a crank angle sensor 45 generating an output pulse each time a crankshaft rotates by a predetermined angle (for example 10°) is connected to the input port 36. This output pulse is input to the input port 36. The ECU 31 calculates the engine speed based on the output of the crank angle sensor 45.

On the other hand, the output port 37 is connected through a corresponding drive circuit 39 to various actuators of the internal combustion engine. In the present embodiment, the output port 37 is connected to spark plugs 10, fuel injectors 11, and a throttle valve drive actuator 17, and the ECU 31 controls these. Specifically, the ECU 31 controls the ignition timings of the spark plugs 10, the injection timings and injection amounts of the fuel injectors, and the opening degree of the throttle valve 18.

Note that, the above-mentioned internal combustion engine is a non-supercharged internal combustion engine fueled by gasoline, but the configuration of the internal combustion engine is not limited to the above configuration. Therefore, the cylinder array, mode of injection of fuel, configuration of the intake and exhaust systems, configuration of the valve operation mechanism, presence of any supercharger, and other specific configurations of the internal combustion engine may be different from the configuration shown in FIG. 1. For example, the fuel injectors 11 may be arranged so as to inject fuel to inside the intake ports 7. Further, a configuration for making the EGR recirculate from the exhaust passage to the intake passage may be provided.

<Exhaust Purification Device of Internal Combustion Engine>

Below, an exhaust purification device of internal combustion engine according to the first embodiment of the present invention (below, simply referred to as the "exhaust purification device") will be explained. The exhaust purification device is provided with an air-fuel ratio control device, an upstream side air-fuel ratio sensor 41, a downstream side air-fuel ratio sensor 42, and a catalyst 20. In the present embodiment, the ECU 31 functions as an air-fuel ratio control device.

The air-fuel ratio control device controls the air-fuel ratio of the exhaust gas flowing into the catalyst 20 (below, referred as the "inflowing exhaust gas"). Specifically, the air-fuel ratio control device sets the target air-fuel ratio of the inflowing exhaust gas and controls the amount of fuel supplied to the combustion chambers 5 so that the air-fuel ratio of the inflowing exhaust gas matches the target air-fuel ratio. For example, the air-fuel ratio control device performs a feedback control on the amount of fuel supplied to the combustion chambers 5 so that the output air-fuel ratio of the upstream side air-fuel ratio sensor 41 matches the target air-fuel ratio. Here, the "output air-fuel ratio" means the air-fuel ratio corresponding to the output value of the air-fuel ratio sensor, i.e., the air-fuel ratio detected by the air-fuel ratio sensor.

Note that, the air-fuel ratio control device may control the amount of fuel supplied to the combustion chambers 5 so that the air-fuel ratio of the inflowing exhaust gas matches the target air-fuel ratio without using the upstream side air-fuel ratio sensor 41. In this case, the air-fuel ratio control device supplies the amount of fuel calculated from the amount of intake air detected by the air flow meter 40 and the target air-fuel ratio to the combustion chambers 5 so that the ratio of the fuel and air supplied to the combustion chambers 5 matches the target air-fuel ratio.

The catalyst 20 is arranged in the exhaust passage and purifies the exhaust gas. The catalyst 20 can store oxygen and, for example, it is a three-way catalyst which can simultaneously remove hydrocarbons (HC), carbon monoxide (CO), and nitrogen oxides (NOx). The catalyst 20 has a substrate (support) comprised of a ceramic, metal, etc., a precious metal having a catalytic action (for example, platinum (Pt), palladium (Pd), rhodium (Rh), etc.), and a co-catalyst having an oxygen storage ability (for example, ceria ($CeO_2$) etc.). The precious metal and co-catalyst are supported on the substrate.

The catalyst 20 stores or releases oxygen in accordance with the air-fuel ratio of the exhaust gas by the co-catalyst. Specifically, the catalyst 20 stores the excess oxygen in the exhaust gas when the air-fuel ratio of the exhaust gas is leaner than the stoichiometric air-fuel ratio. On the other hand, the catalyst 20 releases the amount of oxygen insufficient for causing the HC and CO to oxidize when the air-fuel ratio of the exhaust gas is richer than the stoichiometric air-fuel ratio. As a result, even if the air-fuel ratio of the exhaust gas deviates somewhat from the stoichiometric air-fuel ratio, the air-fuel ratio on the surface of the catalyst 20 is maintained near the stoichiometric air-fuel ratio, and HC, CO, and NOx are effectively removed at the catalyst 20.

However, if an amount of oxygen exceeding the oxygen storage ability of the catalyst 20 flows into the catalyst 20, the precious metal of the catalyst 20 is covered by the oxygen and so-called "oxygen poisoning" occurs. On the other hand, if the oxygen stored in the catalyst 20 is depleted, the precious metal of the catalyst 20 is covered by HC or other such reducing agent and so-called "HC poisoning" occurs. If oxygen poisoning or HC poisoning occurs, the precious metal of the catalyst 20 becomes an inert state and the exhaust purification performance of the catalyst 20 falls. For this reason, in the past, in order to enhance the exhaust purification performance of the catalyst 20, it had been thought desirable to make the atmosphere at the surface of the catalyst 20 approach the stoichiometric air-fuel ratio as much as possible.

Figure 2:
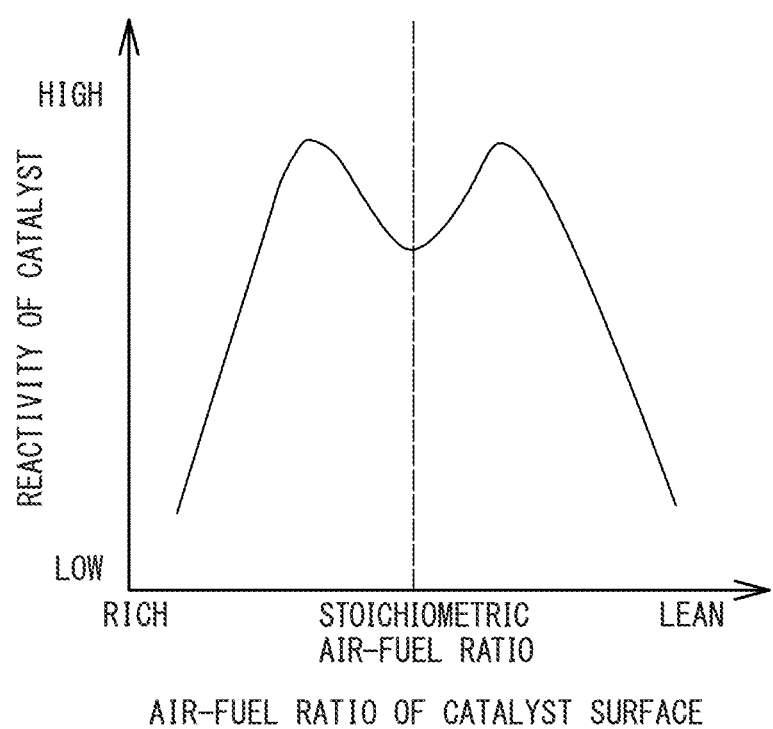
FIG. 2 is a view showing a relationship between an air-fuel ratio of a surface of a catalyst and a reactivity of the catalyst.

However, as a result of intensive studies by the inventors of the present application, it has learned that the exhaust purification performance of the catalyst 20 is further improved in a state where a small amount of oxygen or reducing agent is adsorbed at the precious metal of the catalyst 20. FIG. 2 is a view showing a relationship between the air-fuel ratio at the surface of the catalyst 20 and the reactivity of the catalyst 20. As shown in FIG. 2, the reactivity of the catalyst 20 becomes highest in regions where the air-fuel ratio at the surface of the catalyst 20 slightly deviates to the rich side or lean side from the stoichiometric air-fuel ratio. The specific principle where such a phenomenon occurs is not necessarily clear, but it is considered that it occurs due to the following such mechanism.

HC is removed at the catalyst 20 by an oxidation reaction. At this time, the reaction speed between the HC and oxygen on the precious metal is raised in the state where a small amount of oxygen is adsorbed at the precious metal compared with a state where there is no oxygen on the precious metal. On the other hand, NOx is removed at the catalyst 20 by a reduction reaction. At this time, the reaction speed between the NOx and HC on the precious metal is raised in the state where a small amount of HC is adsorbed at the precious metal compared with a state where there is no HC on the precious metal. Therefore, in order to further raise the exhaust purification performance of the catalyst 20, it is effective to cause different levels of oxygen concentration in the catalyst 20 to an extent where the precious metal does not become an inert state due to oxygen poisoning or HC poisoning.

Figure 3:
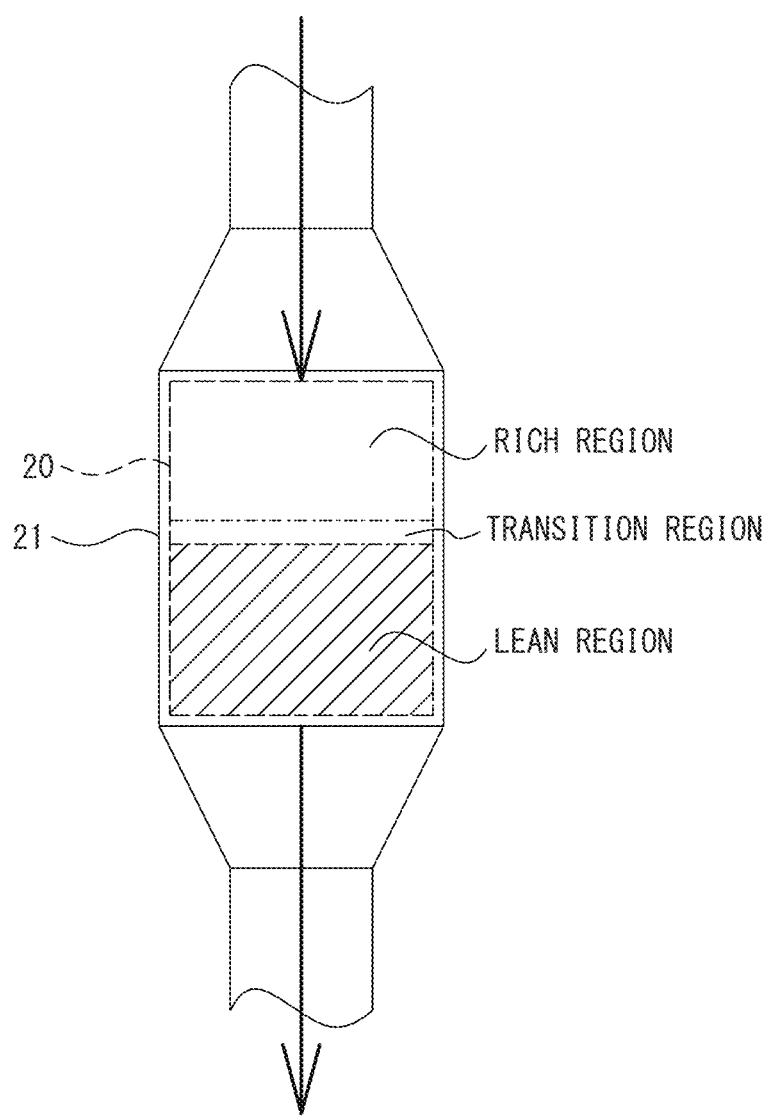
FIG. 3 is a view schematically showing a state of the catalyst when exhaust gas flows into the catalyst.

FIG. 3 is a view schematically showing the state of the catalyst 20 when exhaust gas flows into the catalyst 20. In FIG. 3, the direction of flow of exhaust is shown by the arrow marks. The catalyst 20 has a columnar shape. The axial direction of the catalyst 20 equals to the direction of flow of exhaust.

In the example of FIG. 3, after the catalyst 20 is saturated with oxygen, exhaust gas richer than the stoichiometric air-fuel ratio flows into the catalyst 20. When exhaust gas richer than the stoichiometric air-fuel ratio flows into the catalyst 20, the oxygen stored in the catalyst 20 is released so as to remove the HC etc., in the exhaust gas. At this time, the oxygen stored in the catalyst 20 is released in order from the upstream side. For this reason, in the example of FIG. 3, a lean region where oxygen is stored remains at the downstream side while a rich region where oxygen is depleted is formed at the upstream side. Further, between the lean region and the rich region, a transition region where the local oxygen concentration gradually changes is formed.

Figure 4:
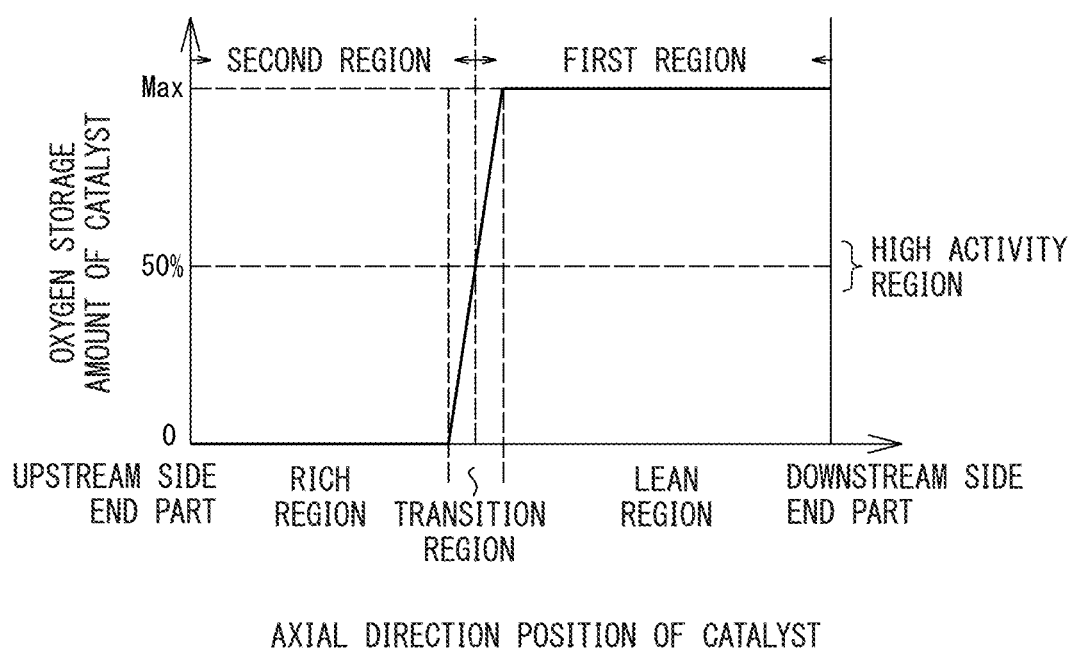
FIG. 4 is a view showing a state of oxygen storage along an axial direction of the catalyst of FIG. 3.

FIG. 4 is a view showing an oxygen storage state along the axial direction of the catalyst 20 of FIG. 3. In FIG. 4, a position on the axial direction of the catalyst 20 is shown as the x-axis while the oxygen storage amount of the catalyst 20 at that position is shown as the y-axis. In the lean region, the oxygen storage amount reaches the maximum oxygen storage amount and a large amount of oxygen is adsorbed at the precious metal. On the other hand, at the rich region, the oxygen storage amount reaches zero and a large amount of reducing agent (for example HC) is adsorbed at the precious metal. Note that, the "maximum oxygen storage amount" means the amount of oxygen which can be stored at the catalyst 20 at a specific position in the axial direction of the catalyst 20.

At the transition region between the lean region and the rich region, the oxygen storage amount changes between zero and the maximum oxygen storage amount resulting in differences in level of oxygen concentration. That is, in the transition region, a portion arises where the oxygen storage amount becomes half of the maximum oxygen storage amount (50%). The vicinity may be considered to correspond to a high activity region raising the local exhaust purification performance of the catalyst 20. For this reason, in the present embodiment, the following air-fuel ratio control is performed to form a high activity region in the catalyst 20.

That is, the air-fuel ratio control device performs distribution forming control controlling the air-fuel ratio of the inflowing exhaust gas so that in the catalyst 20, a first region with an oxygen storage amount of equal to or greater than a predetermined value and a second region with an oxygen storage amount of less than the predetermined value are alternately formed along the axial direction of the catalyst 20. At this time, the air-fuel ratio control device performs a distribution forming control so that a total number of the first region and the second region formed by the distribution forming control becomes equal to or greater than three. By doing this, it is possible to form a plurality of regions with changing oxygen concentration in the catalyst 20 and in turn raise the exhaust purification performance of the catalyst 20. Note that, the total number of the first region and second region formed by the distribution forming control may be equal to or greater than four. By doing this, it is possible to further raise the exhaust purification performance of the catalyst 20.

For example, the predetermined value defining the first region and the second region is half of the maximum oxygen storage amount. In this case, as shown in FIG. 4, in the example of FIG. 4, the lean region and a part of the transition region (part with oxygen storage amount of equal to or greater than 50%) corresponds to the first region, and the rich region and a part of the transition region (part with oxygen storage amount of less than 50%) corresponds to the second region. In the state shown in FIG. 4, if switching the air-fuel ratio of the inflowing exhaust gas to an air-fuel ratio leaner than the stoichiometric air-fuel ratio, oxygen is stored in the catalyst 20 in the order from the upstream side and the second region of the upstream side changes to the first region. At this time, in order to leave a second region between the first region at the downstream side and the first region at the upstream side, it is necessary to prevent oxygen from being supplied to the downstream side end part of the second region. That is, the amount of fluctuation of oxygen of the catalyst 20 (oxygen storage amount) when forming a first region at the upstream side must be made smaller than the amount of fluctuation of oxygen of the catalyst 20 (oxygen release amount) when the second region shown in FIG. 4 is formed.

For this reason, in the distribution forming control, the air-fuel ratio control device alternately performs a rich air-fuel ratio control making the air-fuel ratio of the inflowing exhaust gas richer than the stoichiometric air-fuel ratio and a lean air-fuel ratio control making the air-fuel ratio of the inflowing exhaust gas leaner than the stoichiometric air-fuel ratio so that the amount of fluctuation of oxygen of the catalyst 20 during each air-fuel ratio control gradually becomes smaller. For example, in the distribution forming control, the air-fuel ratio control device alternately performs the rich air-fuel ratio control and the lean air-fuel ratio control so that the time period of performance of each air-fuel ratio control gradually becomes shorter.

Further, the air-fuel ratio control device performs the distribution forming control so that at least one of the boundaries between the first region and the second region is formed at the downstream side of the catalyst 20 and at least one of the boundaries is formed at the upstream side of the catalyst 20. By doing this, it is possible to form high activity regions at the downstream side and the upstream side of the catalyst 20 and in turn possible to efficiently raise the exhaust purification performance of the catalyst 20 as a whole. Note that, the "downstream side of the catalyst 20" means the part at the downstream side from the center in the axial direction of the catalyst 20, while the "upstream side of the catalyst 20" means the part at the upstream side from the center in the axial direction of the catalyst 20.

<Explanation of Distribution Forming Control Using Time Chart>

Figure 5A:
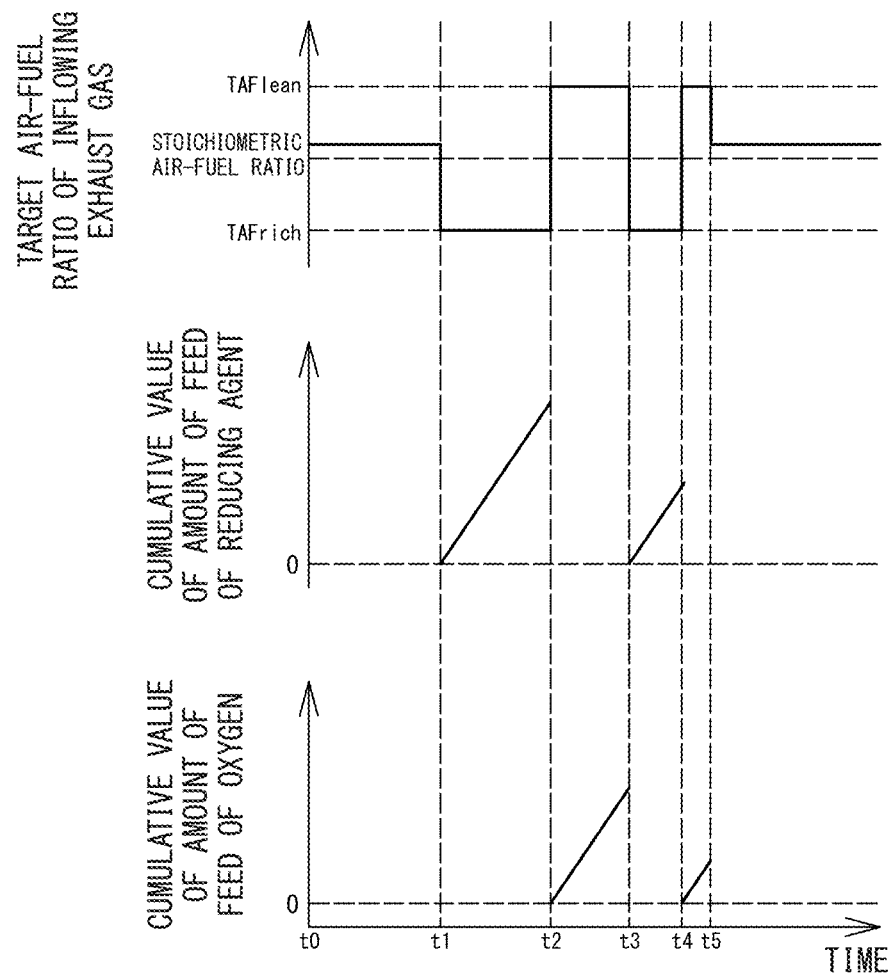
FIG. 5A is a time chart of a target air-fuel ratio of an inflowing exhaust gas, a cumulative value of an amount of feed of a reducing agent, and a cumulative value of an amount of feed of oxygen when distribution forming control is performed in the first embodiment.
Figure 5B:
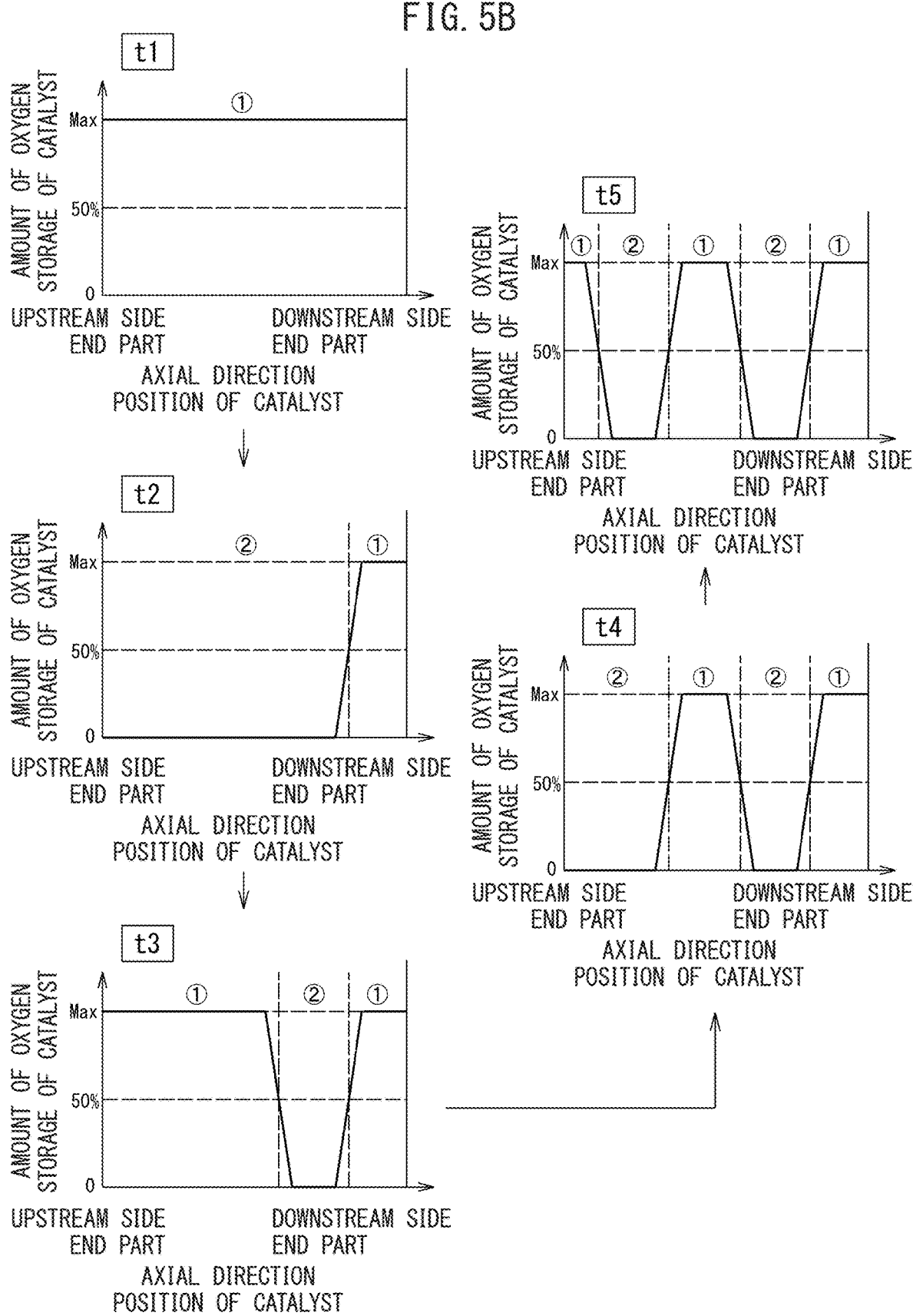
FIG. 5B is a view showing a state of oxygen storage along an axial direction of the catalyst at different times in FIG. 5A.

Referring to FIG. 5A and FIG. 5B, a specific example of the above-mentioned distribution forming control will be explained. FIG. 5A is a time chart of the target air-fuel ratio of the inflowing exhaust gas, the cumulative value of the amount of feed of reducing agent, and the cumulative value of the amount of feed of oxygen when the distribution forming control is performed. FIG. 5B is a view showing the oxygen storage state along the axial direction of the catalyst 20 at different times of FIG. 5A (times t1 to t5).

In the example of FIG. 5A, at the time t0, a normal control is performed and the target air-fuel ratio of the inflowing exhaust gas is set to a value slightly leaner than the stoichiometric air-fuel ratio. After the time t0, at the time t1, the oxygen storage amount reaches the maximum oxygen storage amount at all positions in the axial direction of the catalyst 20, and the catalyst 20 is saturated with oxygen. That is, at the time t1, only the first region is formed at the catalyst 20 and no different levels of oxygen concentration are formed at the catalyst 20.

At the time t1, the distribution forming control is started. First, in order to form a second region at the upstream side of the first region, the target air-fuel ratio of the inflowing exhaust gas is set to a rich set air-fuel ratio TAFrich richer than the stoichiometric air-fuel ratio, and the rich air-fuel ratio control is started. In the rich air-fuel ratio control, a reducing agent is supplied to the catalyst 20, and the cumulative value of the amount of feed of reducing agent gradually increases. As a result, the oxygen stored in the catalyst 20 is released in order from the upstream side and the oxygen storage amount at the upstream side of the catalyst 20 becomes zero.

Rich air-fuel ratio control is performed for exactly a predetermined time period from the time t1 to the time t2. The amount of fluctuation of oxygen (oxygen release amount) during the rich air-fuel ratio control is smaller than the oxygen storage amount which had been stored at the catalyst 20 at the time t1, i.e., the amount of oxygen which can be stored in the catalyst 20 as a whole. For this reason, as shown in FIG. 5B, at the time t2 at the time of the end of the rich air-fuel ratio control, a second region is formed at the upstream side of the first region.

Next, at the time t2, in order to form a first region at the upstream side of the second region, the target air-fuel ratio of the inflowing exhaust gas is set to a lean set air-fuel ratio TAFlean leaner than the stoichiometric air-fuel ratio, and the lean air-fuel ratio control is started. In the lean air-fuel ratio control, oxygen is supplied to the catalyst 20, and the cumulative value of the amount of feed of oxygen gradually increases. As a result, oxygen is stored in order from the upstream side, and the oxygen storage amount of the upstream side of the catalyst 20 becomes the maximum oxygen storage amount.

The lean air-fuel ratio control is performed for exactly a predetermined time period from the time t2 to the time t3. The time period from the time t2 to the time t3 is shorter than the time period from the time t1 to the time t2. As a result, the amount of fluctuation of oxygen (oxygen storage amount) during the lean air-fuel ratio control from the time t2 to the time t3 becomes smaller than the amount of fluctuation of oxygen (oxygen release amount) during the rich air-fuel ratio control from the time t1 to the time t2. For this reason, as shown in FIG. 5B, at the time t3, the first region is formed at the upstream side of the second region.

Next, in order to form a second region at the upstream side of the first region at the upstream side, the rich air-fuel ratio control is performed for exactly a predetermined time period from the time t3 to the time t4. The time period from the time t3 to the time t4 is shorter than the time period from the time t2 to the time t3. As a result, the amount of fluctuation of oxygen (oxygen release amount) during the rich air-fuel ratio control from the time t3 to the time t4 becomes smaller than the amount of fluctuation of oxygen (oxygen storage amount) during the lean air-fuel ratio control from the time t2 to the time t3. For this reason, as shown in FIG. 5B, at the time t4, a second region is formed at the upstream side of the first region at the upstream side.

Next, in order to form a first region at the upstream side of the second region at the upstream side, the lean air-fuel ratio control is performed for exactly a predetermined time period from the time t4 to the time t5. The time period from the time t4 to the time t5 is shorter than the time period from the time t3 to the time t4. As a result, the amount of fluctuation of oxygen (oxygen storage amount) during the lean air-fuel ratio control from the time t4 to the time t5 becomes smaller than the amount of fluctuation of oxygen (oxygen release amount) during the rich air-fuel ratio control from the time t3 to the time t4. For this reason, as shown in FIG. 5B, at the time t5, a first region is formed at the upstream side of the second region at the upstream side. At the time t5, the distribution forming control is ended, and the normal control is again started.

In the example of FIG. 5, the total number of the first region and the second region formed by the distribution forming control is five, that is, the number of the high activity regions formed by the distribution forming control is four. Further, two boundaries between the first region and the second region are formed at the downstream side of the catalyst 20 while two boundaries between the first region and the second region are formed at the upstream side of the catalyst 20.

Note that, in the example of FIG. 5, the distribution forming control is started when the catalyst 20 is saturated with oxygen, but the distribution forming control may be started when the oxygen in the catalyst 20 is depleted, that is, when only a second region is formed at the catalyst 20. In this case, in the distribution forming control, first, the lean air-fuel ratio control is performed so as to form a first region at the upstream side of the second region.

<Distribution Forming Control>

Figure 6A:
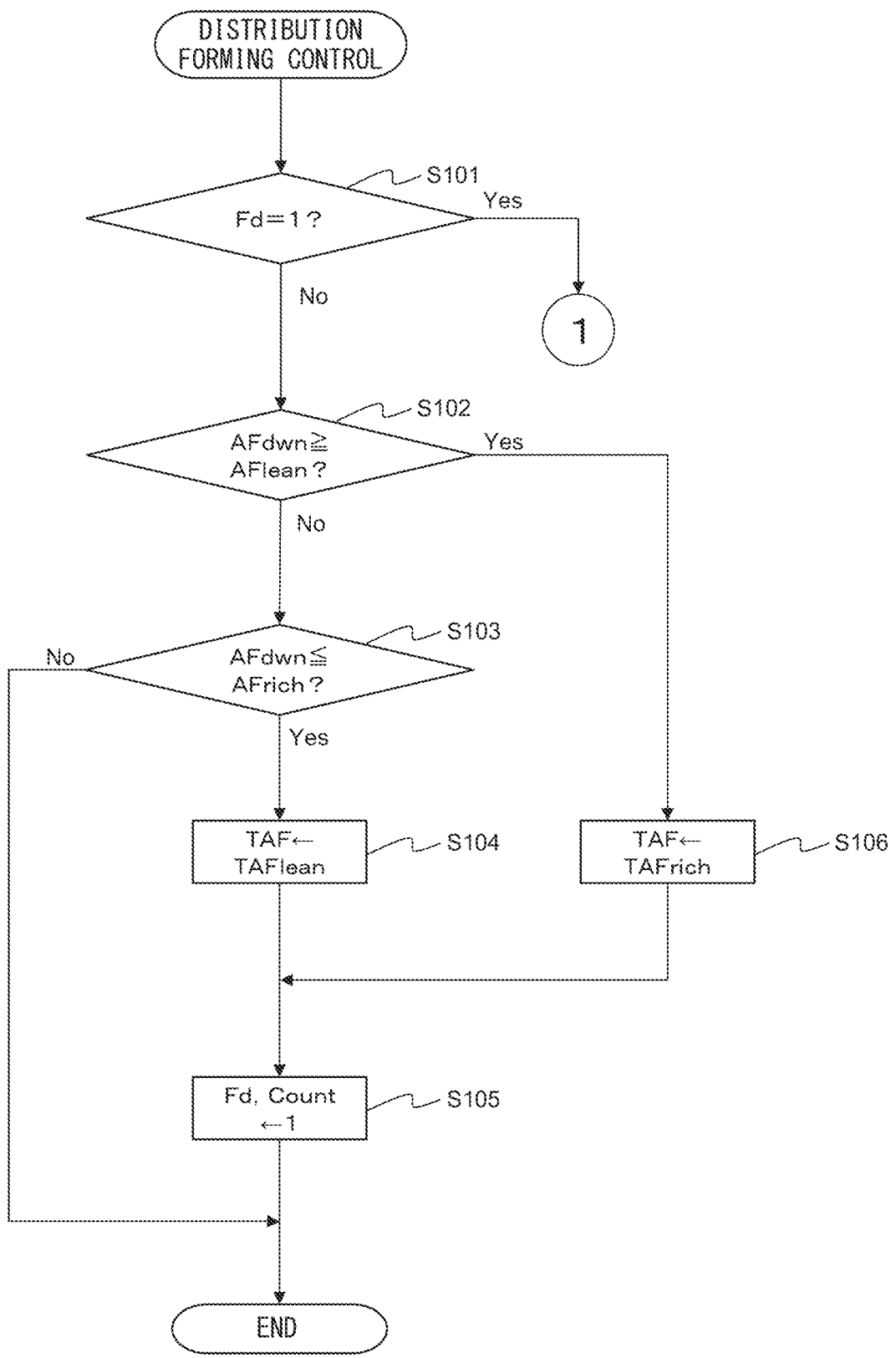
FIG. 6A is a flow chart showing a control routine of distribution forming control in the first embodiment.
Figure 6B:
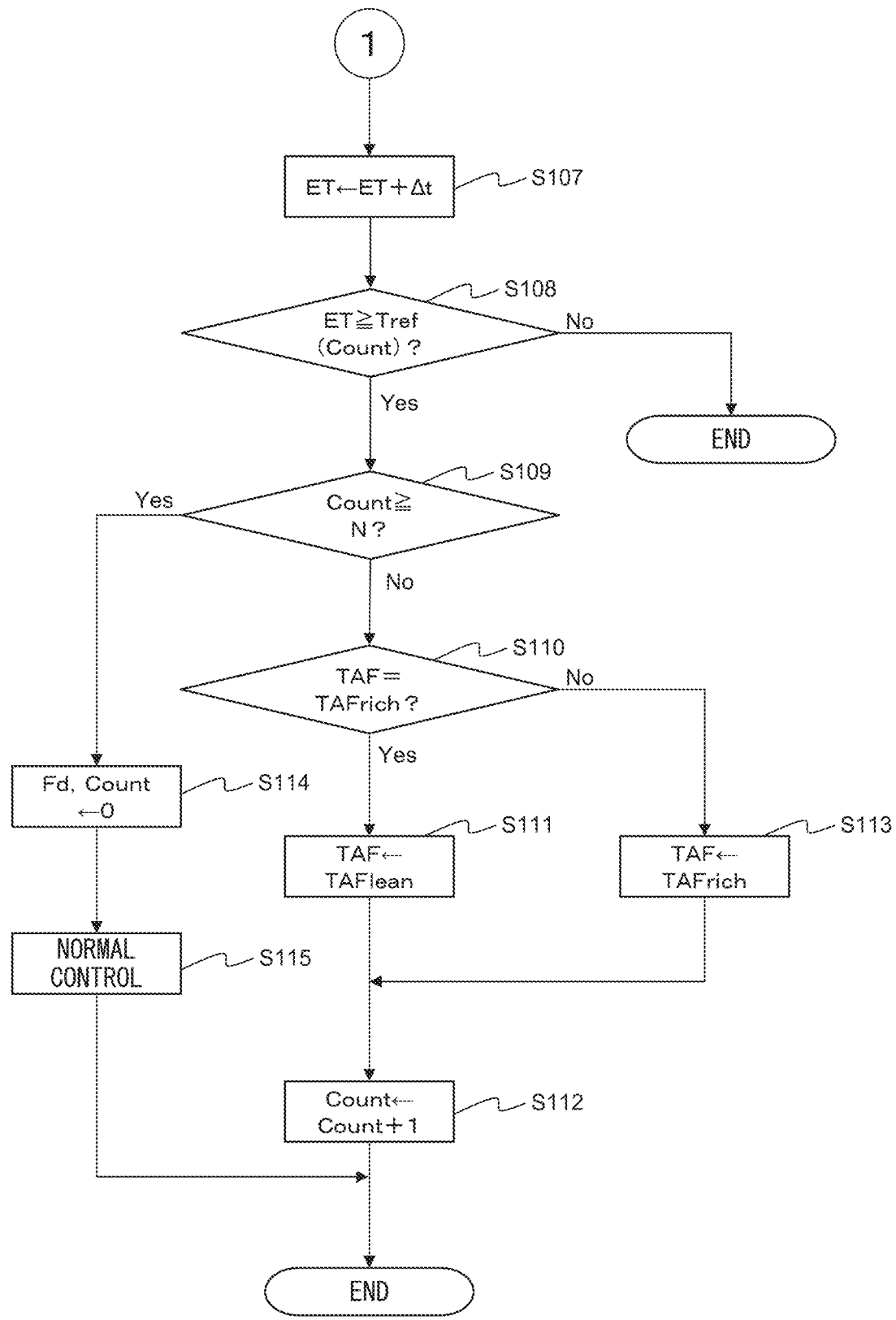
FIG. 6B is a flow chart showing a control routine of distribution forming control in the first embodiment.

Below, using the flow charts of FIG. 6A and FIG. 6B, the above-mentioned distribution forming control will be explained. FIG. 6A and FIG. 6B are flow charts showing a control routine of distribution forming control in the first embodiment. The present control routine is repeatedly performed by the ECU 31 at predetermined time intervals.

First, at step S101, the air-fuel ratio control device judges whether a distribution forming flag Fd is 1. The distribution forming flag Fd is a flag which is set to 1 when the distribution forming control is started and is set to zero when the distribution forming control is ended. Note that, the initial value of the distribution forming flag Fd is zero.

If at step S101 it is judged that the distribution forming flag Fd is zero, the present control routine proceeds to step S102. At step S102, the air-fuel ratio control device judges whether the output air-fuel ratio AFdwn of the downstream side air-fuel ratio sensor 42 is equal to or greater than the lean judged air-fuel ratio AFlean. The lean judged air-fuel ratio AFlean is an air-fuel ratio which is detected by the downstream side air-fuel ratio sensor 42 when the catalyst 20 is saturated with oxygen. The lean judged air-fuel ratio AFlean is predetermined and is set to an air-fuel ratio (for example 14.65) slightly leaner than the stoichiometric air-fuel ratio.

If at step S102 it is judged that the output air-fuel ratio AFdwn of the downstream side air-fuel ratio sensor 42 is richer than the lean judged air-fuel ratio AFlean, that is, if it is judged that the catalyst 20 is not saturated with oxygen, the present control routine proceeds to step S103. At step S103, the air-fuel ratio control device judges whether the output air-fuel ratio AFdwn of the downstream side air-fuel ratio sensor 42 is equal to or less than the rich judged air-fuel ratio AFrich. The rich judged air-fuel ratio AFlean is the air-fuel ratio detected by the downstream side air-fuel ratio sensor 42 when the oxygen of the catalyst 20 is depleted. The rich judged air-fuel ratio AFlean is predetermined and is set to an air-fuel ratio (for example 14.55) slightly richer than the stoichiometric air-fuel ratio. If at step S103 it is judged that the output air-fuel ratio AFdwn of the downstream side air-fuel ratio sensor 42 is leaner than the rich judged air-fuel ratio AFrich, that is, if it is judged that the oxygen of the catalyst 20 is not depleted, the present control routine ends.

On the other hand, if at step S102 it is judged that the output air-fuel ratio AFdwn of the downstream side air-fuel ratio sensor 42 is equal to or greater than the lean judged air-fuel ratio AFlean, that is, if it is judged that catalyst 20 is saturated with oxygen, the present control routine proceeds to step S106. At step S106, the air-fuel ratio control device starts the distribution forming control and sets the target air-fuel ratio of the inflowing exhaust gas TAF to the rich set air-fuel ratio TAFrich. That is, the air-fuel ratio control device performs the rich air-fuel ratio control. The rich judged air-fuel ratio TAFrich is predetermined and is set to an air-fuel ratio (for example 12.6 to 14.4) richer than the stoichiometric air-fuel ratio.

Next, at step S105, the air-fuel ratio control device sets the distribution forming flag Fd and the number of times of performance Count to 1. The number of times of performance Count shows the number of times of performance of the air-fuel ratio control performed during distribution forming control (the rich air-fuel ratio control and the lean air-fuel ratio control). After step S105, the present control routine ends.

Further, if at step S103 it is judged that the output air-fuel ratio AFdwn of the downstream side air-fuel ratio sensor 42 is equal to or less than the rich judged air-fuel ratio AFrich, that is, if it is judged that the oxygen of the catalyst 20 is depleted, the present control routine proceeds to step S104. At step S104, the air-fuel ratio control device starts the distribution forming control and sets the target air-fuel ratio of the inflowing exhaust gas TAF to the lean set air-fuel ratio TAFlean. That is, the air-fuel ratio control device performs the lean air-fuel ratio control. The lean set air-fuel ratio TAFlean is predetermined and is set to an air-fuel ratio (for example 14.8 to 16.6) leaner than the stoichiometric air-fuel ratio.

Next, at step S105, the air-fuel ratio control device sets the distribution forming flag Fd and the number of times of performance Count to 1. After step S105, the present control routine ends.

On the other hand, if at step S101 it is judged that the distribution forming flag Fd is 1, the present control routine proceeds to step S107. At step S107, the air-fuel ratio control device adds an incremental time$\Delta$t to update the cumulative time period ET. The cumulative time period ET shows the time period of performance of the current air-fuel ratio control (the rich air-fuel ratio control or the lean air-fuel ratio control). Further, the incremental time$\Delta$t corresponds to the interval of performance of the present control routine.

Next, at step S108, the air-fuel ratio control device judges whether the cumulative time period ET is equal to or greater than a predetermined time period Tref (Count). The predetermined time period Tref (Count) is predetermined for each of the number of times of performance Count. The predetermined time period Tref (Count) is made shorter the larger the value of the number of times of performance Count. For example, the predetermined time period Tref (2) when the number of times of performance Count is 2 is shorter than the predetermined time period Tref (1) when the number of times of performance Count is 1.

If at step S108 it is judged that the cumulative time period ET is less than the predetermined time period Tref (Count), the present control routine ends. In this case, the current air-fuel ratio control is continued.

On the other hand, if at step S108 it is judged that the cumulative time period ET is equal to or greater than the predetermined time period Tref (Count), the present control routine proceeds to step S109. At step S109, the air-fuel ratio control device judges whether the number of times of performance Count is equal to or greater than a predetermined number of times N. The predetermined number of times N is predetermined. The total number of the first regions and second regions formed by distribution forming control becomes a value of the predetermined number of times N plus 1. The predetermined number of times N is set to equal to or greater than two, preferably equal to or greater than three, more preferably equal to or greater than four.

If at step S109 it is judged that the number of times of performance Count is less than the predetermined number of times N, the present control routine proceeds to step S110. At step S110, the air-fuel ratio control device judges whether the current target air-fuel ratio TAF is the rich set air-fuel ratio TAFrich. That is, the air-fuel ratio control device judges whether the current air-fuel ratio control is the rich air-fuel ratio control.

If at step S110 it is judged that the current target air-fuel ratio TAF is the rich set air-fuel ratio TAFrich, that is, if it is judged that the current air-fuel ratio control is the rich air-fuel ratio control, the present control routine proceeds to step S111. At step S111, the air-fuel ratio control device sets the target air-fuel ratio TAF to the lean set air-fuel ratio TAFlean. That is, the air-fuel ratio control device switches the target air-fuel ratio TAF from the rich set air-fuel ratio TAFrich to the lean set air-fuel ratio TAFlean and performs the lean air-fuel ratio control.

Next, at step S112, the air-fuel ratio control device adds 1 to update the number of times of performance Count. After step S112, the present control routine ends.

On the other hand, if at step S110 it is judged that the current target air-fuel ratio TAF is the lean set air-fuel ratio TAFlean, that is, if it is judged that the current air-fuel ratio control is the lean air-fuel ratio control, the present control routine proceeds to step S113. At step S113, the air-fuel ratio control device sets the target air-fuel ratio TAF to the rich set air-fuel ratio TAFrich. That is, the air-fuel ratio control device switches the target air-fuel ratio TAF from the lean set air-fuel ratio TAFlean to the rich set air-fuel ratio TAFrich and performs rich air-fuel ratio control.

Next, at step S112, the air-fuel ratio control device adds 1 to update the number of times of performance Count. After step S112, the present control routine ends.

After that, if at step S109 it is judged that the number of times of performance Count is equal to or greater than the predetermined number of times N, the present control routine proceeds to step S114. At step S114, the air-fuel ratio control device resets the distribution forming flag Fd and number of times of performance Count to zero.

Next, at step S115, the air-fuel ratio control device starts the normal control. In the normal control, for example, the target air-fuel ratio of the inflowing exhaust gas TAF is set to a value slightly leaner than the stoichiometric air-fuel ratio. Note that, in the normal control, the target air-fuel ratio of the inflowing exhaust gas TAF may be set to a value slightly richer than the stoichiometric air-fuel ratio, the stoichiometric air-fuel ratio, a value corresponding to the operating state of the internal combustion engine, etc. After step S115, the present control routine ends.

Second Embodiment

The configuration and control of the exhaust purification device in a second embodiment are basically similar to the exhaust purification device in the first embodiment. For this reason, below, the second embodiment of the present invention will be explained centered on the parts different from the first embodiment.

As explained above, in the distribution forming control, the air-fuel ratio control device alternately performs the rich air-fuel ratio control and the lean air-fuel ratio control so that the amounts of fluctuation of oxygen of the catalyst 20 during each air-fuel ratio control gradually become smaller. Regarding this, in the second embodiment, by making the target air-fuel ratio during the air-fuel ratio control gradually approach the stoichiometric air-fuel ratio, the amount of fluctuation of oxygen of the catalyst 20 during the air-fuel ratio control is gradually made smaller. That is, the air-fuel ratio control device alternately performs the rich air-fuel ratio control and the lean air-fuel ratio control so that the differences between the target air-fuel ratio of the inflowing exhaust gas and the stoichiometric air-fuel ratio during each air-fuel ratio control gradually become smaller.

<Explanation of Distribution Forming Control Using Time Chart>

Figure 7:
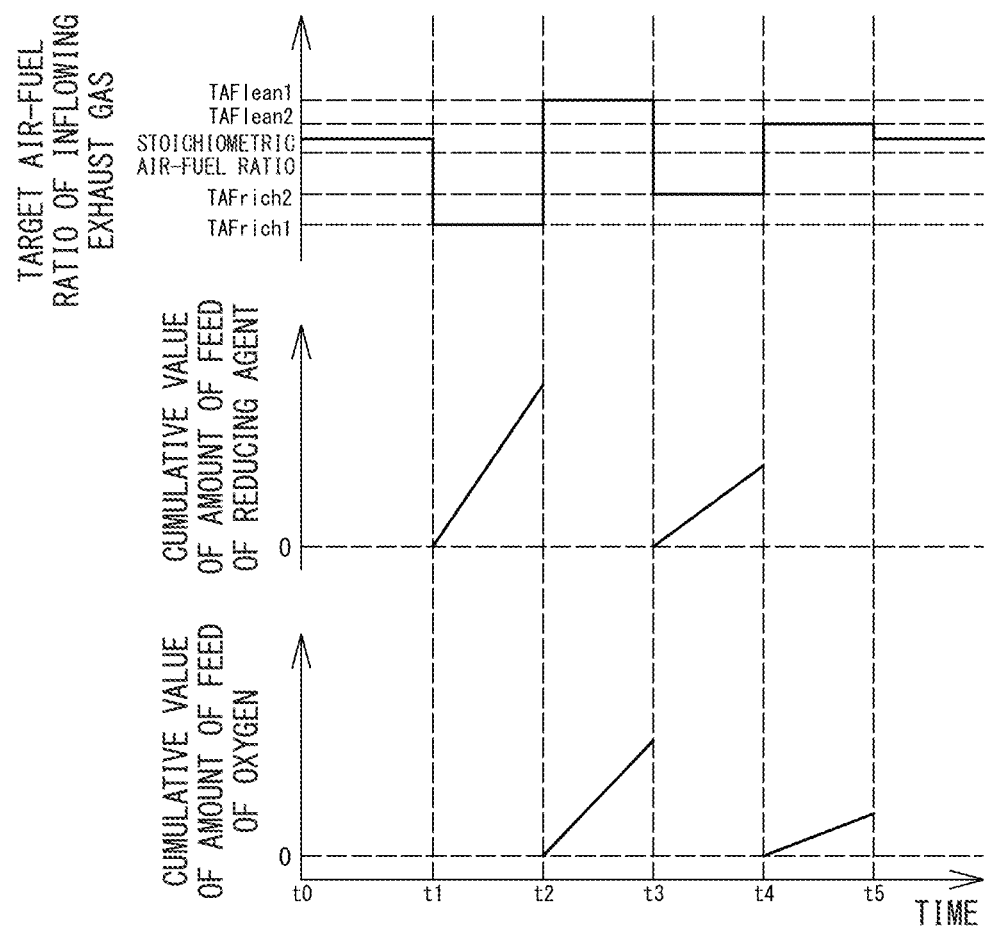
FIG. 7 is a time chart of a target air-fuel ratio of an inflowing exhaust gas, a cumulative value of an amount of feed of reducing agent, and a cumulative value of an amount of feed of oxygen when distribution forming control is performed in a second embodiment.

Referring to FIG. 7, a specific example of distribution forming control in the second embodiment will be explained. FIG. 7 is a time chart of the target air-fuel ratio of the inflowing exhaust gas, the cumulative value of the amount of feed of reducing agent, and the cumulative value of the amount of feed of oxygen when the distribution forming control is performed. In the same way as FIG. 5A, an oxygen storage state along the axial direction of the catalyst 20 at different times of FIG. 7 (times t1 to t5) is shown in FIG. 5B.

In the same way as the example of FIG. 5A, the distribution forming control is started at the time t1 at which only a first region is formed at the catalyst 20. First, in order to form a second region at the upstream side of the first region, the target air-fuel ratio of the inflowing exhaust gas is set to a first rich set air-fuel ratio TAFrich1 richer than the stoichiometric air-fuel ratio, and the rich air-fuel ratio control is started.

The rich air-fuel ratio control is performed for exactly a predetermined time period from the time t1 to the time t2. The amount of fluctuation of oxygen (oxygen release amount) during the rich air-fuel ratio control is smaller than the oxygen storage amount which had been stored at the catalyst 20 at the time t1, that is, the amount of oxygen which can be stored in the catalyst 20 as a whole. For this reason, as shown in FIG. 5B, at the time t2 when the rich air-fuel ratio control is ended, a second region is formed at the upstream side of the first region.

Next, at the time t2, in order to form a first region at the upstream side of second region, the target air-fuel ratio of the inflowing exhaust gas is set to a first lean set air-fuel ratio TAFlean1 leaner than the stoichiometric air-fuel ratio, and the lean air-fuel ratio control is started. The lean air-fuel ratio control is performed for example a predetermined time from the time t2 to the time t3. The time period from the time t2 to the time t3 is equal to the time period from the time t1 to the time t2. Further, the difference between the first lean set air-fuel ratio TAFlean1 and the stoichiometric air-fuel ratio is smaller than the difference between the first rich set air-fuel ratio TAFrich1 and the stoichiometric air-fuel ratio. As a result, the amount of fluctuation of oxygen (oxygen storage amount) during the lean air-fuel ratio control from the time t2 to the time t3 becomes smaller than the amount of fluctuation of oxygen (oxygen release amount) during the rich air-fuel ratio control from the time t1 to the time t2. For this reason, as shown in FIG. 5B, at the time t3, a first region is formed at the upstream side of the second region.

Next, in order to form a second region at the upstream side of the first region of the upstream side, the target air-fuel ratio of the inflowing exhaust gas is set to a second rich set air-fuel ratio TAFrich2 richer than the stoichiometric air-fuel ratio, and the rich air-fuel ratio control is performed. The rich air-fuel ratio control is performed for exactly a predetermined time period from the time t3 to the time t4. The time period from the time t3 to the time t4 is equal to the time period from the time t2 to the time t3. Further, the difference between the second rich set air-fuel ratio TAFrich2 and the stoichiometric air-fuel ratio is smaller than the difference between the first lean set air-fuel ratio TAFlean1 and the stoichiometric air-fuel ratio. As a result, the amount of fluctuation of oxygen (oxygen release amount) during the rich air-fuel ratio control from the time t3 to the time t4 becomes smaller than the amount of fluctuation of oxygen (oxygen storage amount) during the lean air-fuel ratio control from the time t2 to the time t3. For this reason, as shown in FIG. 5B, at the time t4, a second region is formed at the upstream side of the first region at the upstream side.

Next, in order to form a first region at the upstream side of the second region at the upstream side, the target air-fuel ratio of the inflowing exhaust gas is set to a second lean set air-fuel ratio TAFlean2 leaner than the stoichiometric air-fuel ratio, and the lean air-fuel ratio control is performed. The lean air-fuel ratio control is performed for exactly a predetermined time period from the time t4 to the time t5. The time period from the time t4 to the time t5 is equal to the time period from the time t3 to the time t4. Further, the difference between the second lean set air-fuel ratio TAFlean2 and the stoichiometric air-fuel ratio is smaller than the difference between the second rich set air-fuel ratio TAFrich2 and the stoichiometric air-fuel ratio. As a result, the amount of fluctuation of oxygen (oxygen storage amount) during the lean air-fuel ratio control from the time t4 to the time t5 become smaller than the amount of fluctuation of oxygen (oxygen release amount) during the rich air-fuel ratio control from the time t3 to the time t4. For this reason, as shown in FIG. 5B, at the time t5, a first region is formed at the upstream side of the second region at the upstream side. At the time t5, the distribution forming control ends, and the normal control is again started.

<Distribution Forming Control>

Figure 8A:
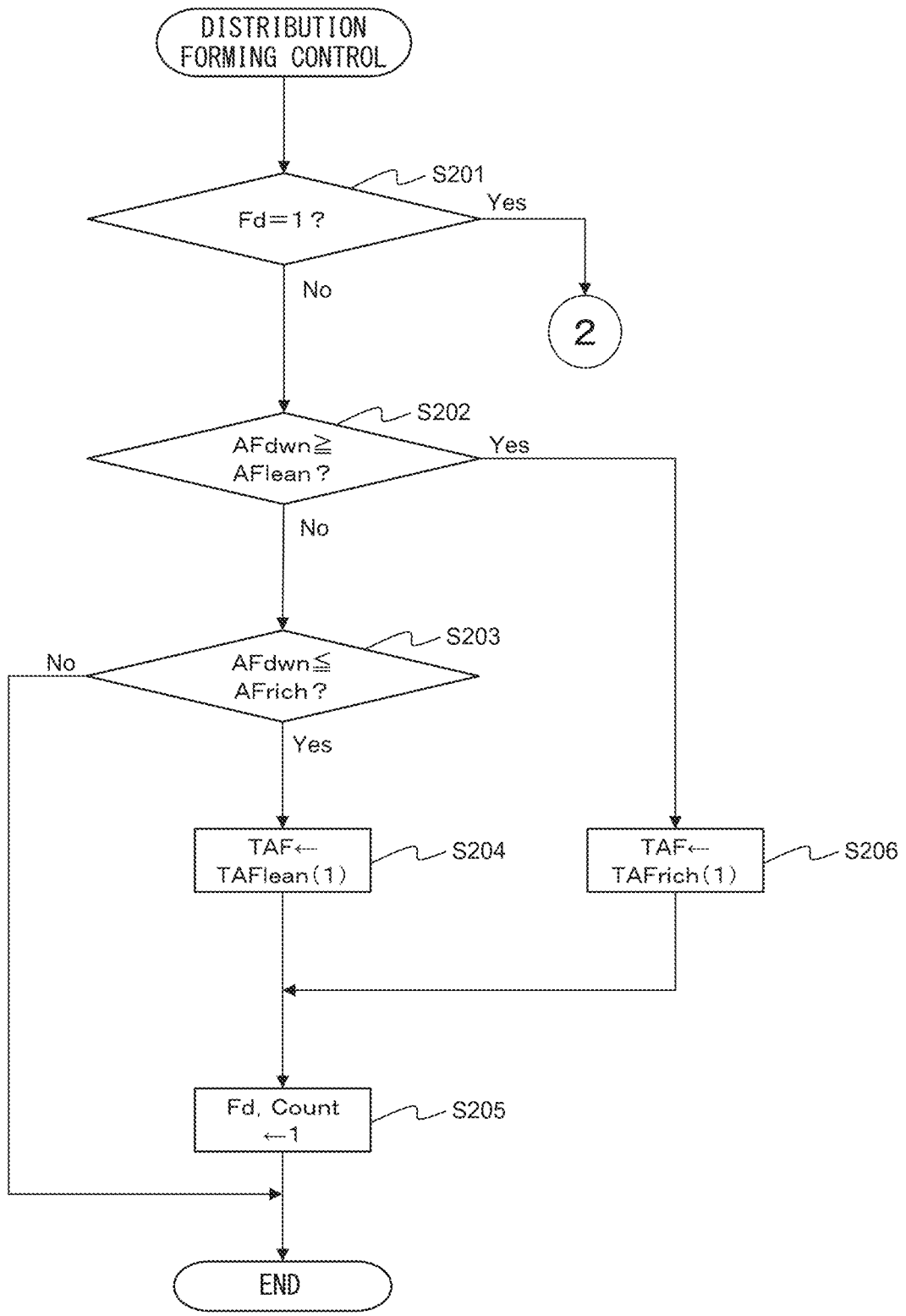
FIG. 8A is a flow chart showing a control routine of distribution forming control in the second embodiment.
Figure 8B:
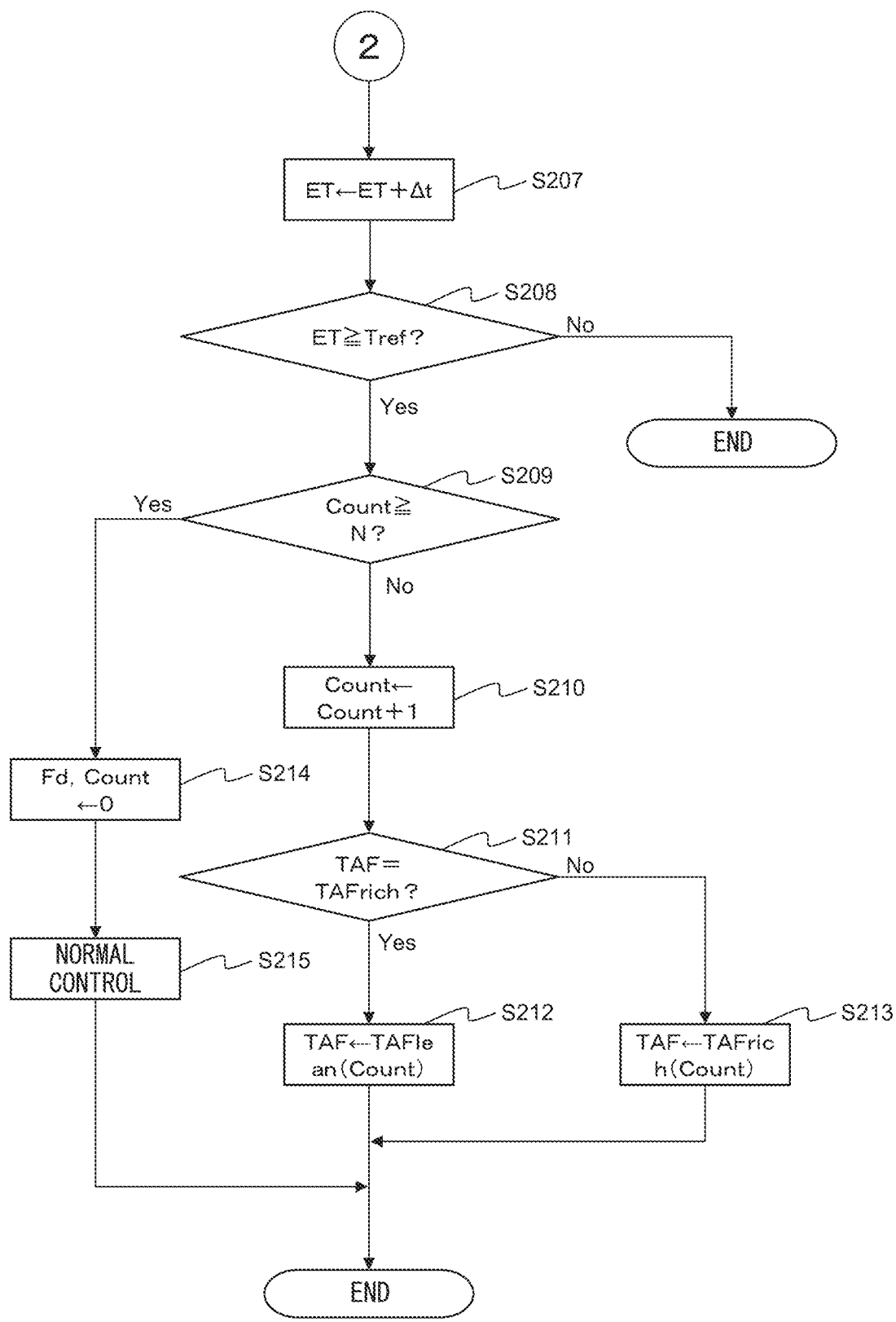
FIG. 8B is a flow chart showing a control routine of distribution forming control in the second embodiment.

FIG. 8A and FIG. 8B are flow charts showing a control routine of the distribution forming control in the second embodiment. The present control routine is repeatedly performed by the ECU 31 at predetermined time intervals.

Steps S201 to S206 are performed in the same way as steps S101 to S106 of FIG. 6A. At this time, at step S206, the air-fuel ratio control device sets the target air-fuel ratio TAF to the rich set air-fuel ratio TAFrich (1) and, at step S204, sets the target air-fuel ratio TAF to the lean set air-fuel ratio TAFlean (1). The rich set air-fuel ratio TAFrich (1) is the rich set air-fuel ratio when the number of times of performance Count is 1 and is predetermined. The lean set air-fuel ratio TAFlean (1) is the lean set air-fuel ratio when the number of times of performance Count is 1 and is predetermined.

If at step S201 it is judged that the distribution forming flag Fd is 1, the present control routine proceeds to step S207. At step S207, in the same way as step S107 of FIG. 6B, the air-fuel ratio control device adds an incremental time$\Delta$t to update the cumulative time period ET.

Next, at step S208, the air-fuel ratio control device judges whether the cumulative time period ET is equal to or greater than a predetermined time period Tref. The predetermined time period Tref is predetermined. If at step S208 it is judged that the cumulative time period ET is less than the predetermined time period Tref, the present control routine ends. In this case, the current air-fuel ratio control is continued.

On the other hand, if at step S208 it is judged that the cumulative time period ET is equal to or greater than the predetermined time period Tref, the present control routine proceeds to step S209. At step S209, in the same way as step S109 of FIG. 6B, the air-fuel ratio control device judges whether the number of times of performance Count is equal to or greater than the predetermined number of times N.

If at step S209 it is judged that the number of times of performance Count is less than the predetermined number of times N, the present control routine proceeds to step S210. At step S210, the air-fuel ratio control device adds 1 to update the number of times of performance Count.

Next, at step S211, the air-fuel ratio control device judges whether the current target air-fuel ratio TAF is the rich set air-fuel ratio TAFrich. If at step S211 it is judged that the current target air-fuel ratio TAF is the rich set air-fuel ratio TAFrich, that is, if it is judged that the current air-fuel ratio control is the rich air-fuel ratio control, the present control routine proceeds to step S212.

At step S212, the air-fuel ratio control device sets the target air-fuel ratio TAF to the lean set air-fuel ratio TAFlean (Count). That is, the air-fuel ratio control device switches the target air-fuel ratio TAF from the rich set air-fuel ratio TAFrich (Count-1) to the lean set air-fuel ratio TAFlean (Count) and performs the lean air-fuel ratio control. The lean set air-fuel ratio TAFlean (Count) is predetermined for each of the number of times of performance Count. The lean degree of the lean set air-fuel ratio TAFlean (Count) is made smaller the larger the value of the number of times of performance Count. Note that, the "lean degree" means the difference between an air-fuel ratio leaner than the stoichiometric air-fuel ratio and the stoichiometric air-fuel ratio. After step S212, the present control routine ends.

On the other hand, if at step S211 it is judged that the current target air-fuel ratio TAF is the lean set air-fuel ratio TAFlean, that is, if it is judged that the current air-fuel ratio control is lean air-fuel ratio control, the present control routine proceeds to step S213. At step S213, the air-fuel ratio control device sets the target air-fuel ratio TAF to the rich set air-fuel ratio TAFrich (Count). That is, the air-fuel ratio control device switches the target air-fuel ratio TAF from the lean set air-fuel ratio TAFlean (Count-1) to the rich set air-fuel ratio TAFrich (Count) and performs the rich air-fuel ratio control. The rich set air-fuel ratio TAFrich (Count) is predetermined for each of the number of times of performance Count. The rich degree of the rich set air-fuel ratio TAFrich (Count) is made smaller the larger the value of the number of times of performance Count. Note that, the "rich degree" means the difference between an air-fuel ratio richer than the stoichiometric air-fuel ratio and the stoichiometric air-fuel ratio. After step S213, the present control routine ends.

Further, if at step S209 it is judged that the number of times of performance Count is equal to or greater than a predetermined number of times N, the present control routine proceeds to step S214. At step S214, the air-fuel ratio control device resets the distribution forming flag Fd and the number of times of performance Count to zero.

Next, at step S215, in the same way as step S115 of FIG. 6B, the air-fuel ratio control device starts normal control. After step S215, the present control routine ends.

Third Embodiment

The configuration and control of the exhaust purification device in the third embodiment are basically similar to the exhaust purification device in the first embodiment. For this reason, below, the third embodiment of the present invention will be explained centered on the parts different from the first embodiment.

As explained above, in the distribution forming control, the air-fuel ratio control device alternately repeats the rich air-fuel ratio control and the lean air-fuel ratio control. In the rich air-fuel ratio control, the target air-fuel ratio of the inflowing exhaust gas is set to a rich set air-fuel ratio, while in the lean air-fuel ratio control, the target air-fuel ratio of the inflowing exhaust gas is set to a lean set air-fuel ratio.

At this time, by increasing the rich degree of the rich set air-fuel ratio and the lean degree of the lean set air-fuel ratio, it is possible to quickly form a plurality of high activity regions inside the catalyst 20 to quickly improve the exhaust purification performance of the catalyst 20. However, if increasing the rich degree of the rich set air-fuel ratio and the lean degree of the lean set air-fuel ratio, the exhaust emissions are liable to deteriorate during the distribution forming control. Further, the more the deterioration of the catalyst 20 progresses, the more the exhaust purification performance of the catalyst 20 will fall and the more remarkable the deterioration of the exhaust emissions will become during the distribution forming control.

Therefore, in the third embodiment, the air-fuel ratio control device calculates the degree of deterioration of the catalyst 20 and sets the rich set air-fuel ratio and lean set air-fuel ratio based on the degree of deterioration of the catalyst 20. By doing this, it is possible to keep the exhaust emissions from deteriorating during the distribution forming control while quickly improving the exhaust purification performance of the catalyst 20 by distribution forming control.

Further, as explained above, the air-fuel ratio control device alternately performs the rich air-fuel ratio control and the lean air-fuel ratio control so that the amount of fluctuation of oxygen of the catalyst 20 during each air-fuel ratio control gradually become smaller. The amount of fluctuation of oxygen of the catalyst 20 (oxygen release amount) during the rich air-fuel ratio control becomes greater the greater the amount of feed of reducing agent during the rich air-fuel ratio control. On the other hand, the amount of fluctuation of oxygen of the catalyst 20 (amount of storage of oxygen) during the lean air-fuel ratio control becomes greater the greater the amount of feed of oxygen to the catalyst 20 during the lean air-fuel ratio control. Further, the amount of feed of reducing agent and the amount of feed of oxygen to the catalyst 20 fluctuate according to the operating state of the internal combustion engine.

For this reason, in the third embodiment, the air-fuel ratio control device calculates the amount of feed of reducing agent to the catalyst 20 during the rich air-fuel ratio control and makes the rich air-fuel ratio control end when the amount of feed of reducing agent to the catalyst 20 reaches a predetermined amount. By doing this, it is possible to keep reducing agent from being supplied to the downstream side end part of the first region when forming a second region at the upstream side of a first region and possible to more reliably form a high activity region between the first region and the second region. Further, the air-fuel ratio control device calculates the amount of feed of oxygen to the catalyst 20 during the lean air-fuel ratio control and makes the lean air-fuel ratio control end when the amount of feed of oxygen to the catalyst 20 reaches a predetermined amount. By doing this, it is possible to keep oxygen from being supplied to the downstream side end part of the second region when forming a first region at the upstream side of a second region and possible to more reliably form a high activity region between the second region and the first region.

<Processing for Setting Air-Fuel Ratio>

Figure 9:
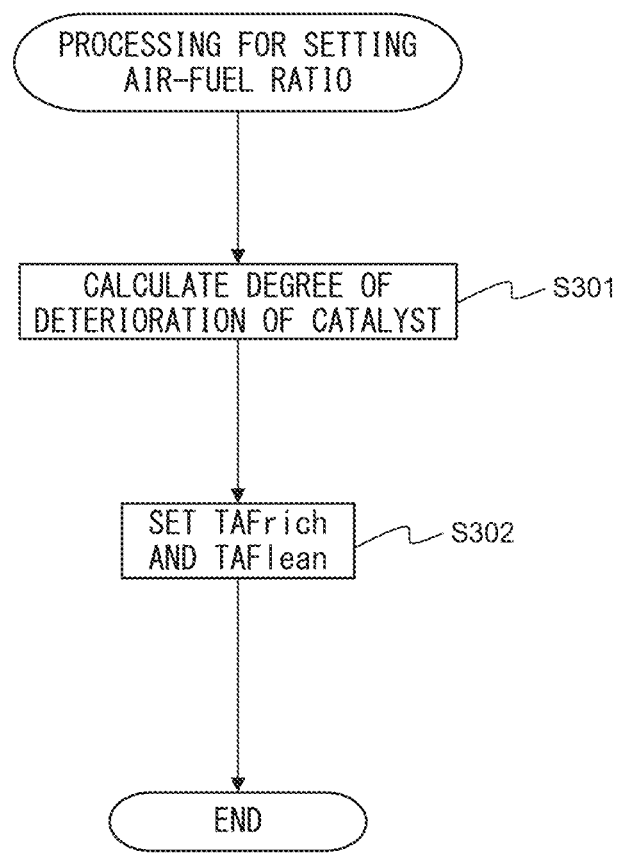
FIG. 9 is a flow chart showing a control routine of air-fuel ratio setting processing in a third embodiment.

FIG. 9 is a flow chart showing a control routine of processing for setting an air-fuel ratio in the third embodiment. The present control routine is repeatedly performed by the ECU 31 at predetermined times, for example, is performed one time each time an ignition switch of the vehicle mounting the internal combustion engine is turned to ON.

First, at step S301, the air-fuel ratio control device calculates a degree of deterioration of the catalyst 20. For example, the air-fuel ratio control device uses a known technique to calculate the amount of oxygen able to be stored in the catalyst 20 as a whole and calculates the degree of deterioration of the catalyst 20 based on the amount. In this case, the smaller the amount of oxygen able to be stored in the catalyst 20 as a whole, the larger the degree of deterioration of the catalyst 20 is made. Note that, considering the deterioration of the catalyst 20 over time, the air-fuel ratio control device may calculate the degree of deterioration of the catalyst 20 based on the cumulative amount of intake air etc.

Next, at step S302, the air-fuel ratio control device, for example, uses a map to set the rich set air-fuel ratio TAFrich and lean set air-fuel ratio TAFlean based on the degree of deterioration of the catalyst 20. In the map, the larger the degree of deterioration of the catalyst 20, that is, the more deteriorated the catalyst 20, the smaller the rich degree of the rich set air-fuel ratio TAFrich and the lean degree of the lean set air-fuel ratio TAFlean are made. After step S302, the present control routine ends.

<Distribution Forming Control>

Figure 10A:
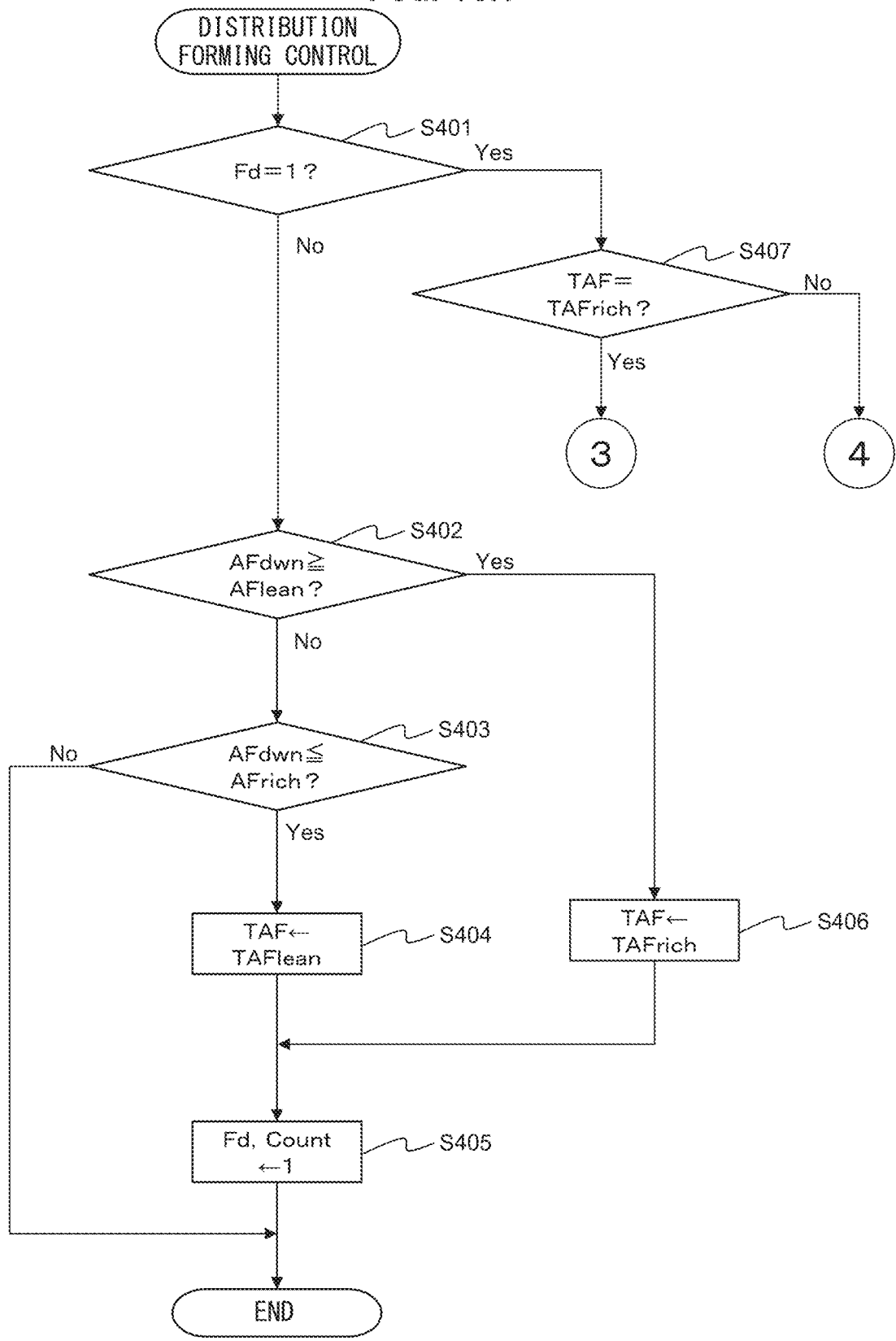
FIG. 10A is a flow chart showing a control routine of distribution forming control in the third embodiment.
Figure 10B:
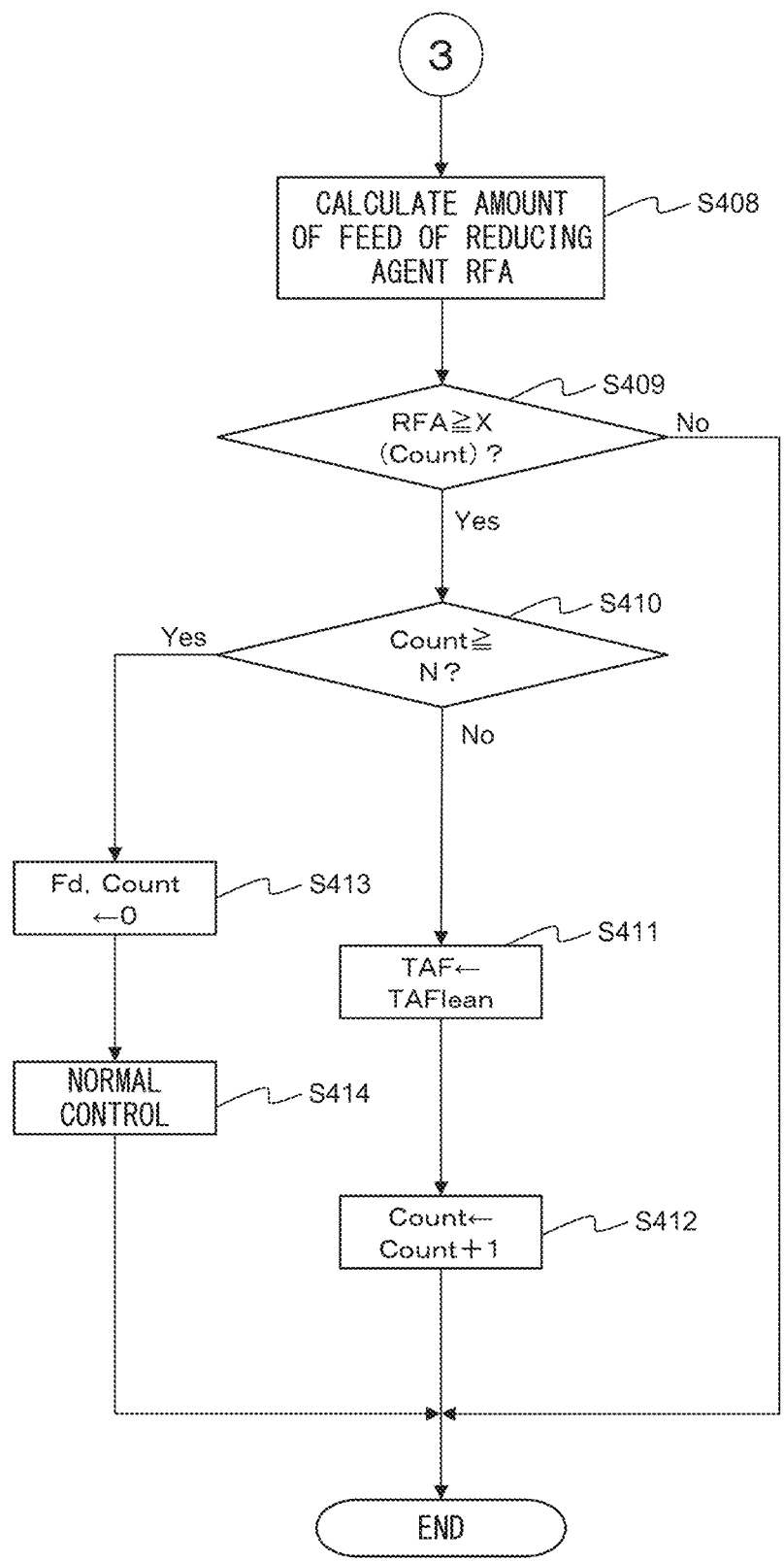
FIG. 10B is a flow chart showing a control routine of distribution forming control in the third embodiment.
Figure 10C:
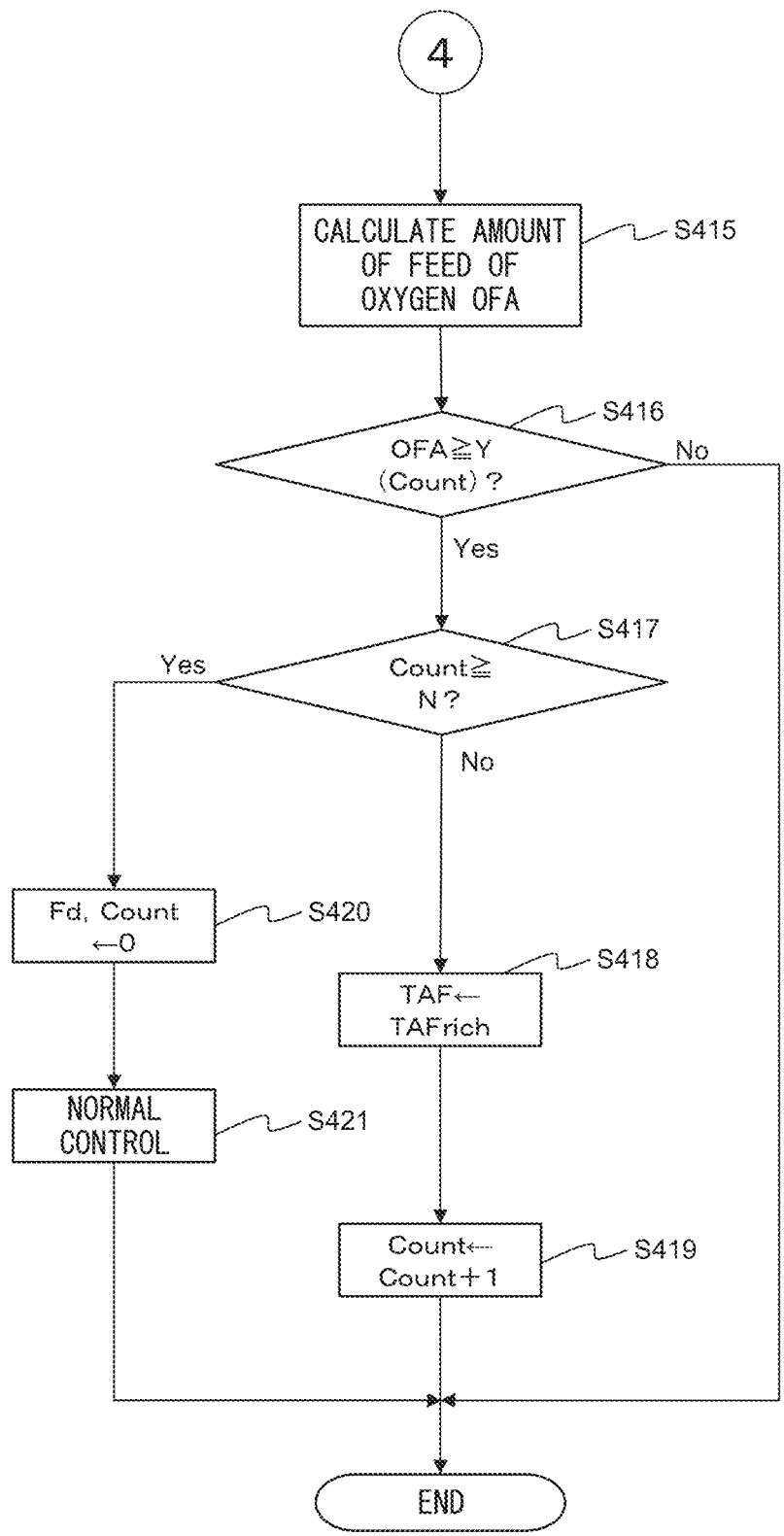
FIG. 10C is a flow chart showing a control routine of distribution forming control in the third embodiment.

FIG. 10A to FIG. 10C are flow charts showing a control routine of distribution forming control in the third embodiment. The present control routine is repeatedly performed by the ECU 31 at predetermined time intervals.

Steps S401 to S406 are performed in the same way as steps S101 to S106 of FIG. 6A. At this time, as the lean set air-fuel ratio TAFlean at step S404 and the rich set air-fuel ratio TAFrich at step S406, values set by the control routine of FIG. 9 are used.

If it is judged at step S401 that the distribution forming flag Fd is 1, the present control routine proceeds to step S407. At step S407, the air-fuel ratio control device judges whether the current target air-fuel ratio TAF is the rich set air-fuel ratio TAFrich. That is, the air-fuel ratio control device judges whether the current air-fuel ratio control is the rich air-fuel ratio control.

If at step S407 it is judged that the current target air-fuel ratio TAF is the rich set air-fuel ratio TAFrich, that is, if it is judged that the current air-fuel ratio control is rich air-fuel ratio control, the present control routine proceeds to step S408. At step S408, the air-fuel ratio control device calculates the amount of feed of reducing agent RFA to the catalyst 20 during the rich air-fuel ratio control.

The amount of the reducing agent flowing into the catalyst 20 changes in accordance with the air-fuel ratio of the inflowing exhaust gas and the flow rate of exhaust. Further, the flow rate of exhaust can be calculated based on the amount of intake air detected by the air flow meter 40 and the amount of fuel injection of the fuel injectors 11. For this reason, for example, the air-fuel ratio control device calculates the amount of reducing agent flowing into the catalyst 20 per unit time based on the output air-fuel ratio of the upstream side air-fuel ratio sensor 41, the amount of intake air, and the amount of fuel injection and cumulative adds the amount to calculate the amount of feed of reducing agent RFA to the catalyst 20. Note that, the air-fuel ratio of the inflowing exhaust gas may be calculated from the amount of intake air and the amount of fuel injection. That is, the air-fuel ratio control device calculates the amount of reducing agent flowing into the catalyst 20 per unit time based on the amount of intake air and the amount of fuel injection.

Next, at step S409, the air-fuel ratio control device judges whether the amount of feed of reducing agent RFA is equal to or greater than a predetermined amount X (Count). The predetermined amount X (Count) is predetermined for each of the number of times of performance Count. The predetermined amount X (Count) is made smaller the larger the value of the number of times of performance Count. For example, the predetermined amount X (2) when the number of times of performance Count is 2 is smaller than the predetermined amount X (1) when the number of times of performance Count is 1.

If at step S409 it is judged that the amount of feed of reducing agent RFA is less than the predetermined amount X (Count), the present control routine ends. On the other hand, if at step S409 it is judged that the amount of feed of reducing agent RFA is equal to or greater than the predetermined amount X (Count), the present control routine proceeds to step S410. At step S410, in the same way as step S109 of FIG. 6B, the air-fuel ratio control device judges whether the number of times of performance Count is equal to or greater than a predetermined number of times N.

If at step S410 it is judged that the number of times of performance Count is less than the predetermined number of times N, the present control routine proceeds to step S411. At step S411, the air-fuel ratio control device sets the target air-fuel ratio TAF to the lean set air-fuel ratio TAFlean. That is, the air-fuel ratio control device switches the target air-fuel ratio TAF from the rich set air-fuel ratio TAFrich to the lean set air-fuel ratio TAFlean and performs the lean air-fuel ratio control. At this time, the value set by the control routine of FIG. 9 is used as the lean set air-fuel ratio TAFlean.

Next, at step S412, the air-fuel ratio control device adds 1 to update the number of times of performance Count. After step S412, the present control routine ends.

On the other hand, if at step S410 it is judged that the number of times of performance Count is equal to or greater than the predetermined number of times N, the present control routine proceeds to step S413. At step S413, the air-fuel ratio control device resets the distribution forming flag Fd and number of times of performance Count to zero.

Next, at step S414, in the same way as step S115 of FIG. 6B, the air-fuel ratio control device starts the normal control. After step S414, the present control routine ends.

Further, if at step S407 it is judged that the current target air-fuel ratio TAF is the lean set air-fuel ratio TAFlean, that is, if it is judged that the current air-fuel ratio control is lean air-fuel ratio control, the present control routine proceeds to step S415. At step S415, the air-fuel ratio control device calculates the amount of feed of oxygen OFA to the catalyst 20 during the lean air-fuel ratio control.

The amount of oxygen flowing into the catalyst 20 changes in accordance with the air-fuel ratio of the inflowing exhaust gas and the flow rate of exhaust. For this reason, for example, the air-fuel ratio control device calculates the amount of oxygen flowing into the catalyst 20 per unit time based on the output air-fuel ratio of the upstream side air-fuel ratio sensor 41, the amount of intake air, and the amount of fuel injection and cumulatively adds the amount to calculate the amount of feed of oxygen OFA to the catalyst 20. Note that, the air-fuel ratio control device may calculate the amount of oxygen flowing into the catalyst 20 per unit time based on the amount of intake air and amount of fuel injection.

Next, at step S416, the air-fuel ratio control device judges whether the amount of feed of oxygen OFA is equal to or greater than a predetermined amount Y (Count). The predetermined amount Y (Count) is set in advance for each of the number of times of performance Count. The predetermined amount Y (Count) is made smaller the larger the value of the number of times of performance Count. For example, the predetermined amount Y(2) when the number of times of performance Count is 2 is smaller than the predetermined amount Y(1) when the number of times of performance Count is 1.

If at step S416 it is judged that the amount of feed of oxygen OFA is less than a predetermined amount Y (Count), the present control routine ends. On the other hand, if at step S416 it is judged that the amount of feed of oxygen OFA is equal to or greater than the predetermined amount Y (Count), the present control routine proceeds to step S417. At step S417, in the same way as step S109 of FIG. 6B, the air-fuel ratio control device judges whether the number of times of performance Count is equal to or greater than a predetermined number of times N.

If at step S417 it is judged that the number of times of performance Count is less than a predetermined number of times N, the present control routine proceeds to step S418. At step S418, the air-fuel ratio control device sets the target air-fuel ratio TAF to the rich set air-fuel ratio TAFrich. That is, the air-fuel ratio control device switches the target air-fuel ratio TAF from the lean set air-fuel ratio TAFlean to the rich set air-fuel ratio TAFrich and performs the rich air-fuel ratio control. At this time, as the rich set air-fuel ratio TAFrich, the value set by the control routine of FIG. 9 is used.

Next, at step S419, the air-fuel ratio control device adds 1 to update the number of times of performance Count. After step S419, the present control routine ends.

On the other hand, if at step S417 it is judged that the number of times of performance Count is equal to or greater than the predetermined number of times N, the present control routine proceeds to step S420. At step S420, the air-fuel ratio control device resets the distribution forming flag Fd and number of times of performance Count to zero.

Next, at step S421, in the same way as step S115 of FIG. 6B, the air-fuel ratio control device starts the normal control. After step S421, the present control routine ends.

Note that, at the third embodiment, the control routine of FIG. 9 may be omitted, and predetermined values may be used as the lean set air-fuel ratio TAFlean at step S404 of FIG. 10A and step S411 of FIG. 10B and as the rich set air-fuel ratio TAFrich at step S406 of FIG. 10A and step S418 of FIG. 10C.

Fourth Embodiment

The configuration and control of the exhaust purification device in the fourth embodiment are basically similar to the exhaust purification device in the first embodiment. For this reason, below, the fourth embodiment of the present invention will be explained centered on the parts different from the first embodiment.

As explained above, the catalyst 20 has a precious metal having a catalytic action. The precious metal includes, for example, platinum (Pt), palladium (Pd), and rhodium (Rh). The Pt, Pd, and Rh used as the precious metal respectively differ in durability with respect to heat degradation in an oxidizing atmosphere and reducing atmosphere. The specific principle why such a phenomenon occurs is not necessarily clear, but it is considered that it occurs due to the following such mechanism.

Pt and Rh have the properties of becoming higher in vapor pressure at the time of a high temperature when oxidized. In other words, Pt and Rh have the properties of the vapor pressure becoming higher at predetermined temperatures in an oxidizing atmosphere compared with a reducing atmosphere. For this reason, in an oxidizing atmosphere more than a reducing atmosphere, vaporization of Pt and Rh easily occurs and heat degradation of the catalyst 20 is promoted.

On the other hand, Pd has the property of becoming lower in vapor pressure at the time of a high temperature when oxidized. In other words, Pd has the property of the vapor pressure becoming lower at a predetermined temperature in an oxidizing atmosphere compared with a reducing atmosphere. For this reason, vaporization of Pd more easily occurs and heat deterioration of the catalyst 20 is promoted in an oxidizing atmosphere compared with a reducing atmosphere.

Therefore, in a first region with an oxygen storage amount of equal to or greater than a predetermined value, the heat deterioration of the catalyst 20 due to vaporization of Pt and Rh is promoted more than in a second region with an oxygen storage amount of less than the predetermined value. On the other hand, in the second region, heat deterioration of the catalyst 20 due to vaporization of Pd is promoted more than the first region. For this reason, if the first region and the second region are formed at the same positions inside the catalyst 20 at all times when the distribution forming control is repeatedly performed, heat deterioration of the catalyst 20 due to specific precious metals is liable to locally proceed.

For example, at a position where the first region is repeatedly formed, vaporization of Pt and Rh is promoted, the oxidation reaction of HC and CO by Pt and the reduction reaction of NOx by Rh are suppressed, and the exhaust purification performance of the catalyst 20 falls. On the other hand, at a position where the second region is repeatedly formed, vaporization of Pd is promoted, the oxidation reaction of HC and CO by Pd is suppressed, and the exhaust purification performance of the catalyst 20 falls.

Therefore, in the fourth embodiment, if repeatedly performing distribution forming control, the air-fuel ratio control device controls the air-fuel ratio of the inflowing exhaust gas so that the positions of the first region and the second region formed at the catalyst 20 by the distribution forming control are reversed. In other words, if repeatedly performing the distribution forming control, the air-fuel ratio control device controls the air-fuel ratio of the inflowing exhaust gas so that the distribution of the first region and the second region formed at the catalyst 20 by the distribution forming control reverses. By doing this, it is possible to keep heat deterioration of the catalyst 20 from locally proceeding and in turn possible to keep the exhaust purification performance of the catalyst 20 from falling.

As explained above, in the distribution forming control, the air-fuel ratio control device alternately performs the rich air-fuel ratio control and the lean air-fuel ratio control. For example, when switching the positions of the first region and the second region, the air-fuel ratio control device reverses the order of the rich air-fuel ratio control and the lean air-fuel ratio control in the succeeding distribution forming control.

Figure 11:
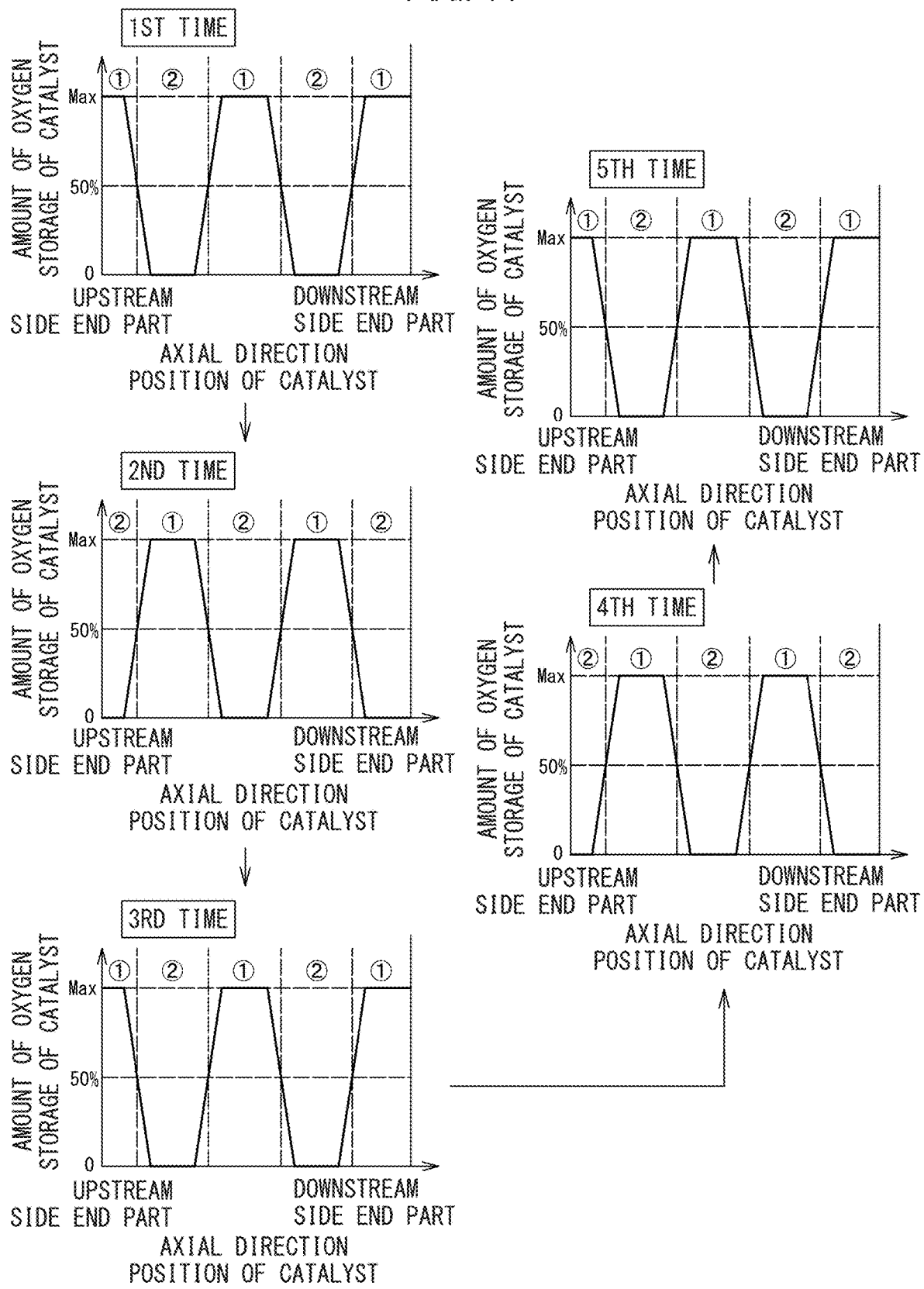
FIG. 11 is a view showing an example of distribution of first regions and second regions formed at the catalyst if distribution forming control is repeatedly performed in a fourth embodiment.

FIG. 11 is a view showing one example of the distribution of the first regions and second regions formed at the catalyst 20 if the distribution forming control is repeatedly performed in the fourth embodiment. In the first, third, and fifth distribution forming controls, the rich air-fuel ratio control is performed first from the state where the oxygen of the catalyst 20 is saturated. On the other hand, in the second and fourth distribution forming control, the lean air-fuel ratio control is performed first from the state where the oxygen of the catalyst 20 is depleted.

As a result, at the catalyst 20 after the first, third, and fifth distribution forming controls, a first region is formed at the downstream most side of the catalyst 20 and a first region and a second region are alternately formed along the axial direction of the catalyst 20. On the other hand, at the catalyst 20 after the second and fourth distribution forming controls, a second region is formed at the downstream most side of the catalyst 20 and a second region and a first region are alternately formed along the axial direction of the catalyst 20. That is, each time the distribution forming control is performed, the distribution of the first regions and second regions at the catalyst 20 is reversed.

<Distribution Forming Control>

Figure 12:
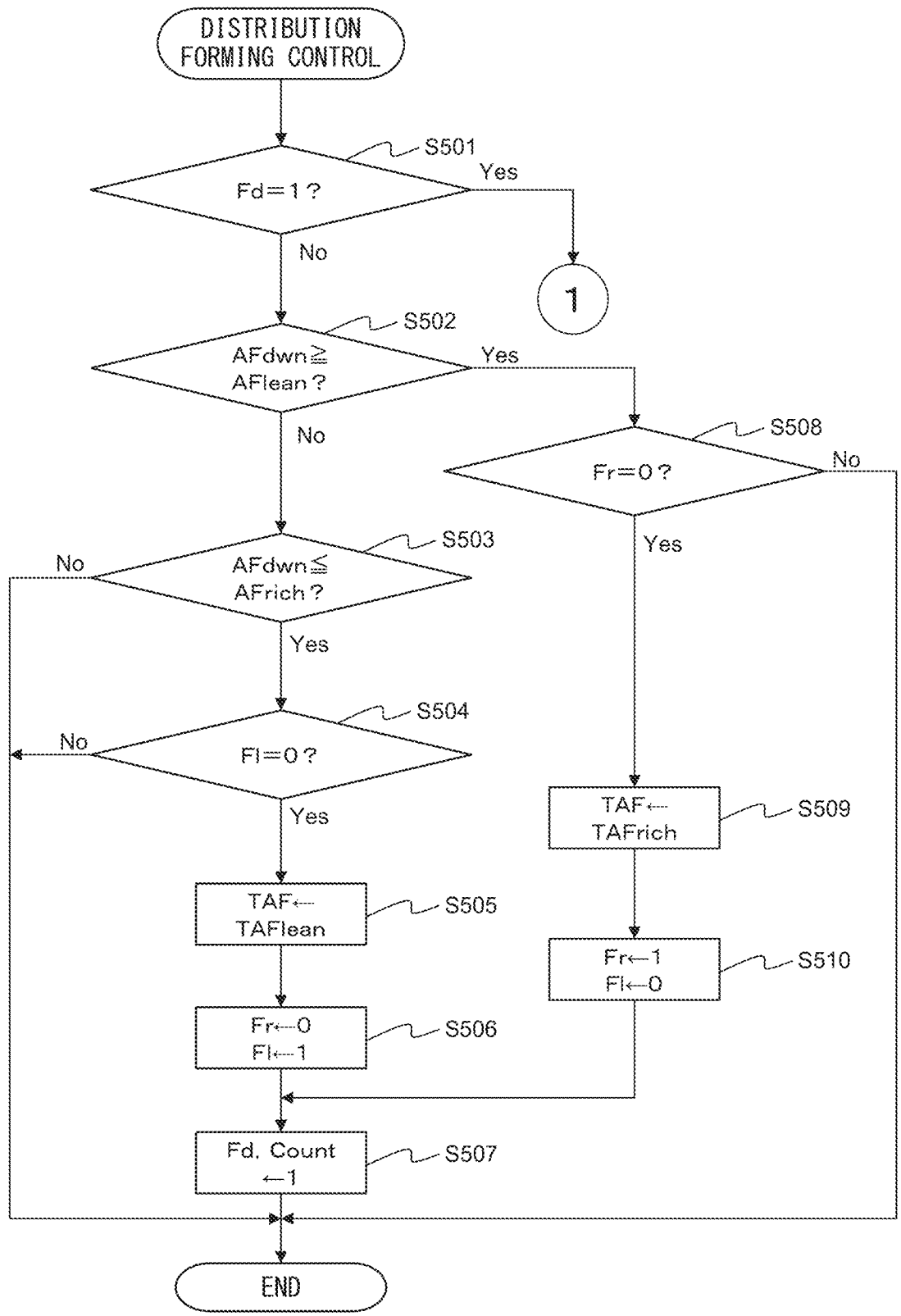
FIG. 12 is a flow chart showing a control routine of distribution forming control in the fourth embodiment.

FIG. 12 is a flow chart showing a control routine of the distribution forming control in the fourth embodiment. The present control routine is repeatedly performed by the ECU 31 at predetermined time intervals.

Step S501 to step S503 are performed in the same way as steps S101 to S103 of FIG. 6A. If at step S502 it is judged that the output air-fuel ratio AFdwn of the downstream side air-fuel ratio sensor 42 is equal to or greater than the lean judged air-fuel ratio AFlean, that is, if it is judged that the catalyst 20 is saturated with oxygen, the present control routine proceeds to step S508.

At step S508, the air-fuel ratio control device judges whether the rich flag Fr is zero. The rich flag Fr is a flag which is set to 1 when the rich air-fuel ratio control is performed first in the distribution forming control and which is set to zero when the lean air-fuel ratio control is performed first in the distribution forming control. Note that, the initial value of the rich flag Fr is zero.

If at step S508 it is judged that the rich flag Fr is 1, that is, if the rich air-fuel ratio control was performed first in the previous distribution forming control, the present control routine ends. On the other hand, if at step S508 it is judged that the rich flag Fr is zero, the present control routine proceeds to step S509. At step S509, in the same way as step S106 of FIG. 6A, the air-fuel ratio control device starts the distribution forming control and sets the target air-fuel ratio of the inflowing exhaust gas TAF to the rich set air-fuel ratio TAFrich. That is, the air-fuel ratio control device performs the rich air-fuel ratio control.

Next, at step S510, the air-fuel ratio control device sets the rich flag Fr to 1 and sets the lean flag Fl to zero. Next, at step S507, in the same way as step S105 of FIG. 6A, the air-fuel ratio control device sets the distribution forming flag Fd and the number of times of performance Count to 1. After step S507, the present control routine ends.

Further, if at step S503 it is judged that the output air-fuel ratio AFdwn of the downstream side air-fuel ratio sensor 42 is equal to or less than the rich judged air-fuel ratio AFrich, that is, if it is judged that the oxygen of the catalyst 20 has been depleted, the present control routine proceeds to step S504. At step S504, the air-fuel ratio control device judges whether the lean flag Fl is zero. The lean flag Fl is a flag which is set to 1 when lean air-fuel ratio control is performed first in the distribution forming control and which is set to zero when the rich air-fuel ratio control is performed first in distribution forming control. Note that the initial value of the lean flag Fl is zero.

If at step S504 it is judged that the lean flag Fl is 1, that is, if the lean air-fuel ratio control was performed first in the previous distribution forming control, the present control routine ends. On the other hand, if at step S508 it is judged that the lean flag Fl is zero, the present control routine proceeds to step S505. At step S505, in the same way as step S104 of FIG. 6A, the air-fuel ratio control device starts the distribution forming control and sets the target air-fuel ratio of the inflowing exhaust gas TAF to the lean set air-fuel ratio TAFlean. That is, the air-fuel ratio control device performs the lean air-fuel ratio control.

Next, at step S506, the air-fuel ratio control device sets the rich flag Fr to zero and sets the lean flag Fl to 1. Next, at step S507, in the same way as step S105 of FIG. 6A, the air-fuel ratio control device sets the distribution forming flag Fd and the number of times of performance Count to 1. After step S507, the present control routine ends.

On the other hand, if at step S501 it is judged that the distribution forming flag Fd is 1, in the same way as the first embodiment, step S107 to step S115 of FIG. 6B are performed and the first region and the second region are formed at the catalyst 20.

Note that, if at step S508 it is judged that the rich flag Fr is 1, the air-fuel ratio control device may set the target air-fuel ratio of the inflowing exhaust gas TAF to an air-fuel ratio richer than the stoichiometric air-fuel ratio (for example, the rich set air-fuel ratio TAFrich) so that the output air-fuel ratio AFdwn of the downstream side air-fuel ratio sensor 42 becomes equal to or less than the rich judged air-fuel ratio AFrich. Further, if at step S504 it is judged that the lean flag Fl is 1, the air-fuel ratio control device may set the target air-fuel ratio of the inflowing exhaust gas TAF to an air-fuel ratio leaner than the stoichiometric air-fuel ratio (for example, the lean set air-fuel ratio TAFlean) so that the output air-fuel ratio AFdwn of the downstream side air-fuel ratio sensor 42 becomes equal to or greater than the lean judged air-fuel ratio AFlean.

Further, according to the control routine, each time the distribution forming control is performed, the positions of the first regions and the positions of the second regions at the catalyst 20 are reversed. However, the positions of the first regions and the positions of the second regions at the catalyst 20 may be reversed each time the distribution forming control is performed a plurality of times.

OTHER EMBODIMENTS

Above, preferred embodiments according to the present invention were explained, but the present invention is not limited to these embodiments. They can be corrected and changed in various ways within the language of the claims. For example, a downstream side catalyst may be arranged in the exhaust passage at the downstream side of the catalyst 20, and the distribution forming control may be performed so that the first region and the second region are alternately formed at the downstream side catalyst.

Further, the air-fuel ratio control device may start the distribution forming control when the total number of the first region and the second region formed at the catalyst 20 is two and the length in the axial direction of the region at the downstream side is equal to or less than a predetermined value (for example, 1/10 to 1/2 of the length of the catalyst 20 in the axial direction). That is, the air-fuel ratio control device may start the distribution forming control before the oxygen of the catalyst 20 is depleted or before the catalyst 20 is saturated with oxygen in the normal control. For example, the air-fuel ratio control device may start the distribution forming control at the oxygen storage state such as at t2 of FIG. 5B. In this case, the air-fuel ratio control device estimates the oxygen storage state of the catalyst 20 based on the amount of feed of oxygen and the amount of feed of reducing agent to the catalyst 20 during the normal control.

Further, when a predetermined condition is satisfied, the air-fuel ratio control device performs a fuel cut control stopping the injection of fuel by the fuel injectors 11. Normally, if fuel cut control is performed, a large amount of oxygen is supplied to the catalyst 20 and the catalyst 20 becomes saturated with oxygen. That is, after performing fuel cut control, only a first region is formed at the catalyst 20. For this reason, the air-fuel ratio control device may start the distribution forming control after ending the fuel cut control.

Figure 13:
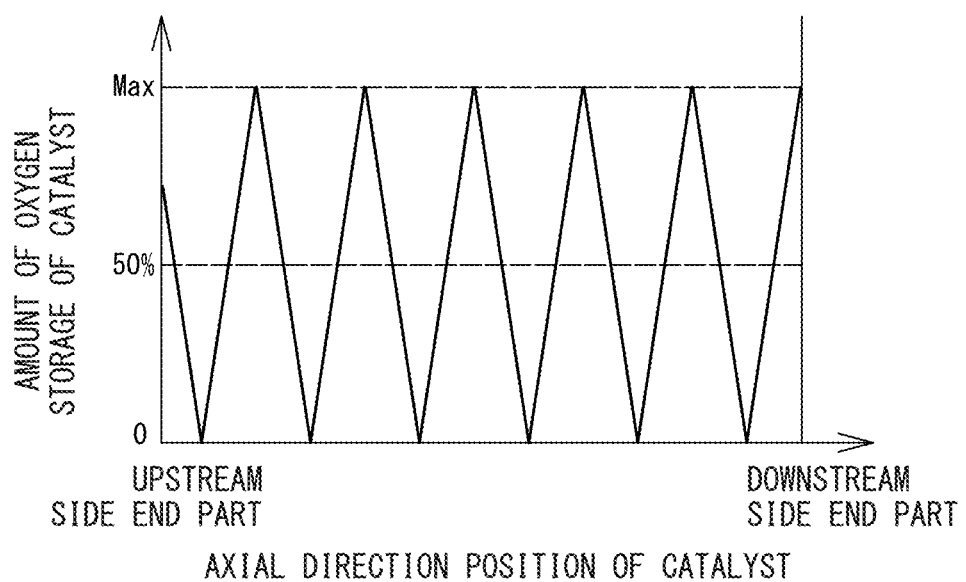
FIG. 13 is a view showing one example of a state of oxygen storage along the axial direction of the catalyst after distribution forming control.
Figure 14:
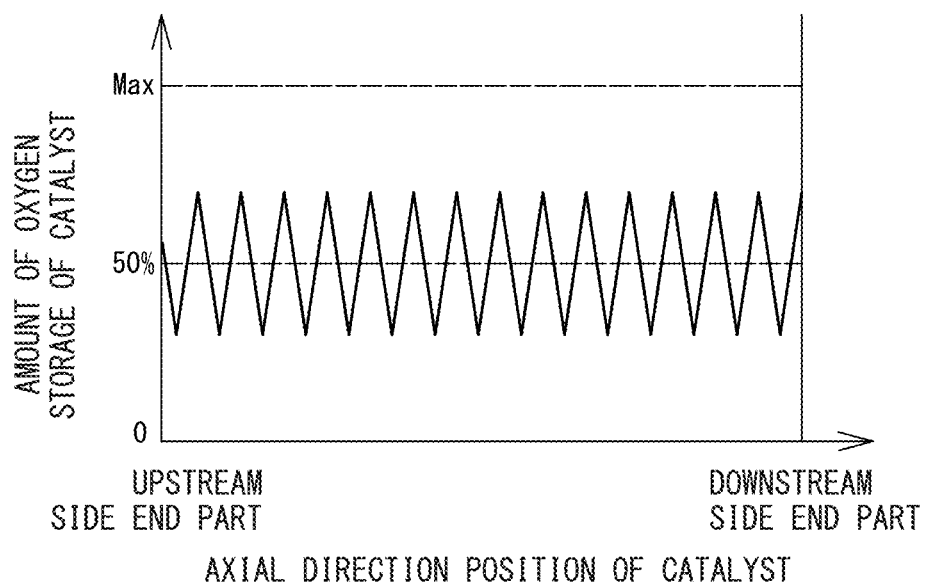
FIG. 14 is a view showing one example of a state of oxygen storage along the axial direction of the catalyst after distribution forming control.

Further, the air-fuel ratio control device may perform the distribution forming control so that different levels of oxygen concentration such as shown in FIG. 13 or FIG. 14 are formed. FIG. 13 and FIG. 14 are views showing examples of the oxygen storage state along the axial direction of the catalyst 20 after the distribution forming control. The state shown in FIG. 13 or FIG. 14 can be formed by making the difference of the amounts of fluctuation of oxygen of the catalyst 20 between the rich air-fuel ratio control and the lean air-fuel ratio control in the distribution forming control smaller.

If the state of FIG. 13 is formed, when forming a second region at the upstream side of a first region, the air-fuel ratio control device performs the rich air-fuel ratio control so that the oxygen storage amount of the catalyst 20 reaches the maximum oxygen storage amount at one location in the axial direction of the first region. Further, when forming a first region at the upstream side of a second region, the air-fuel ratio control device performs the lean air-fuel ratio control so that the oxygen storage amount of the catalyst 20 reaches zero at one location in the axial direction of the second region.

If the state of FIG. 14 is formed, when forming a second region at the upstream side of a first region, the air-fuel ratio control device performs the rich air-fuel ratio control so that the oxygen storage amount of the catalyst 20 at the first region becomes less than the maximum oxygen storage amount. Further, when forming a first region at the upstream side of a second region, the air-fuel ratio control device performs the lean air-fuel ratio control so that the oxygen storage amount of the catalyst 20 at the second region becomes greater than zero. Therefore, in the example of FIG. 14, compared with the example of FIG. 13, the difference in the amounts of fluctuation of oxygen of the catalyst 20 between the rich air-fuel ratio control and the lean air-fuel ratio control in the distribution forming control is made further smaller. Note that, in an example such as FIG. 14, the rich air-fuel ratio control and the lean air-fuel ratio control may be performed so that the center of the range of fluctuation of the oxygen storage amount of the catalyst 20 becomes a value other than half (50%) of the maximum oxygen storage amount.

Further, the above embodiments may be worked freely combined. For example, if the control routine of FIG. 10A to FIG. 10C is performed, instead of steps S404 and S406 of FIG. 10A, steps S204 and S206 of FIG. 8A may be performed, instead of steps S411 and S412 of FIG. 10B, steps S210 and S212 of FIG. 8B may be performed, and instead of steps S418 and S419 of FIG. 10C, steps S210 and step S213 of FIG. 8B may be performed.

Further, if the control routine of FIG. 6A and FIG. 6B is performed, the values set by the control routine of FIG. 9 may be used as the lean set air-fuel ratio TAFlean at step S104 of FIG. 6A and step S111 of FIG. 6B and the rich set air-fuel ratio TAFrich at step S106 of FIG. 6A and step S113 of FIG. 6B. Similarly, if the control routine of FIG. 12 and FIG. 6B is performed, the values set by the control routine of FIG. 9 may be used as the lean set air-fuel ratio TAFlean at step S505 of FIG. 12 and step S111 of FIG. 6B and the rich set air-fuel ratio TAFrich at step S509 of FIG. 12 and step S113 of FIG. 6B. Similarly, if the control routine of FIG. 8A and FIG. 8B is performed, the values set by the control routine of FIG. 9 may be used as the lean set air-fuel ratio TAFlean (1) at step S204 of FIG. 8A and as the rich set air-fuel ratio TAFrich (1) at step S206 of FIG. 8A.

Further, if the control routine of FIG. 8A and FIG. 8B is performed, instead of step S208 of FIG. 8B, step S108 of FIG. 6B may be performed. That is, in the distribution forming control, the air-fuel ratio control device may alternately perform the rich air-fuel ratio control and the lean air-fuel ratio control so that the differences of the target air-fuel ratio of the inflowing exhaust gas and the stoichiometric air-fuel ratio at each air-fuel ratio control gradually becomes smaller and the time period of performance of each air-fuel ratio controls gradually becomes shorter.

Further, if the control routine of FIG. 8A and FIG. 8B is performed, steps S504 and S506 of FIG. 12 may be performed around step S204, and steps S508 and S510 of FIG. 12 may be performed around step S206. Further, if the control routine of FIG. 10A to FIG. 10C is performed, steps S504 and S506 of FIG. 12 may be performed around step S404, and steps S508 and S510 of FIG. 12 may be performed around step S406.

REFERENCE SIGNS LIST 20 catalyst
31 ECU

The invention claimed is:

1. An exhaust purification device of an internal combustion engine comprising:
   a catalyst arranged in an exhaust passage and able to store oxygen; and
   an electronic control unit configured to control an air-fuel ratio of inflowing exhaust gas flowing into the catalyst, wherein
   the electronic control unit is configured to perform a distribution forming control controlling the air-fuel ratio of the inflowing exhaust gas so that in the catalyst, a first region with an oxygen storage amount of equal to or greater than a predetermined value and a second region with an oxygen storage amount of less than the predetermined value are alternately formed along an axial direction of the catalyst, and
   a total number of the first region and the second region formed by the distribution forming control is equal to or greater than three.

2. The exhaust purification device of the internal combustion engine according to claim 1, wherein the electronic control unit is configured to perform the distribution forming control so that at least one boundary between the first region and the second region is formed at a downstream side of the catalyst and at least one boundary is formed at an upstream side of the catalyst.

3. The exhaust purification device of the internal combustion engine according to claim 1, wherein the total number of the first region and the second region formed by the distribution forming control is equal to or greater than four.

4. The exhaust purification device of the internal combustion engine according to claim 1, wherein in the distribution forming control, the electronic control unit is configured to alternately perform a rich air-fuel ratio control making the air-fuel ratio of the inflowing exhaust gas richer than a stoichiometric air-fuel ratio and a lean air-fuel ratio control making the air-fuel ratio of the inflowing exhaust gas leaner than the stoichiometric air-fuel ratio so that an amount of fluctuation of oxygen of the catalyst during each air-fuel ratio control gradually becomes smaller.

5. The exhaust purification device of the internal combustion engine according to claim 4, wherein in the distribution forming control, the electronic control unit is configured to alternately perform the rich air-fuel ratio control and the lean air-fuel ratio control so that a difference between a target air-fuel ratio of the inflowing exhaust gas and the stoichiometric air-fuel ratio in each air-fuel ratio control gradually becomes smaller.

6. The exhaust purification device of the internal combustion engine according to claim 4, wherein in the distribution forming control, the electronic control unit is configured to alternately perform the rich air-fuel ratio control and the lean air-fuel ratio control so that a time period of performance of each air-fuel ratio control gradually becomes shorter.

7. The exhaust purification device of the internal combustion engine according to claim 4, wherein in the distribution forming control, the electronic control unit is configured to alternately perform the rich air-fuel ratio control and the lean air-fuel ratio control so that a difference between a target air-fuel ratio of the inflowing exhaust gas and the stoichiometric air-fuel ratio in each air-fuel ratio control gradually becomes smaller and a time period of performance of each air-fuel ratio control gradually becomes shorter.

8. The exhaust purification device of the internal combustion engine according to claim 4, wherein the electronic control unit is configured to calculate an amount of feed of a reducing agent to the catalyst during the rich air-fuel ratio control and end the rich air-fuel ratio control when the amount of feed of the reducing agent has reached a predetermined amount, and calculate an amount of feed of an oxygen to the catalyst during the lean air-fuel ratio control and end the lean air-fuel ratio control when the amount of feed of the oxygen has reached a predetermined amount.

9. The exhaust purification device of the internal combustion engine according to claim 4, wherein the electronic control unit is configured to calculate a degree of deterioration of the catalyst and set a target air-fuel ratio of the inflowing exhaust gas during the rich air-fuel ratio control and a target air-fuel ratio of the inflowing exhaust gas during the lean air-fuel ratio control based on the degree of deterioration.

10. The exhaust purification device of the internal combustion engine according to claim 1, wherein the electronic control unit is configured to control the air-fuel ratio of the inflowing exhaust gas so that positions of the first region and the second region formed at the catalyst by the distribution forming control are reversed, if repeatedly performing the distribution forming control.

11. A catalyst arranged in an exhaust passage of an internal combustion engine and able to store oxygen, wherein
a first region with an oxygen storage amount of equal to or greater than a predetermined value and a second region with an oxygen storage amount of less than the predetermined value are alternately formed along an axial direction of the catalyst, and a total number of the first region and the second region is equal to or greater than three.

12. An exhaust purification device of an internal combustion engine comprising:
a catalyst arranged in an exhaust passage and able to store oxygen; and
an electronic control unit configured to control an air-fuel ratio of inflowing exhaust gas flowing into the catalyst, wherein
the electronic control unit is configured to perform a distribution forming control controlling the air-fuel ratio of the inflowing exhaust gas so that in the catalyst, a first region with an oxygen storage amount of equal to or greater than a predetermined value and a second region with an oxygen storage amount of less than the predetermined value are alternately formed along an axial direction of the catalyst, and
a total number of the first region and the second region formed by the distribution forming control is equal to or greater than three,
wherein in the distribution forming control, the electronic control unit is configured to alternately perform a rich air-fuel ratio control making the air-fuel ratio of the inflowing exhaust gas richer than a stoichiometric air-fuel ratio and a lean air-fuel ratio control making the air-fuel ratio of the inflowing exhaust gas leaner than the stoichiometric air-fuel ratio so that an amount of fluctuation of oxygen of the catalyst during each air-fuel ratio control gradually becomes smaller,
wherein the electronic control unit is configured to calculate an amount of feed of a reducing agent to the catalyst during the rich air-fuel ratio control and end the rich air-fuel ratio control when the amount of feed of the reducing agent has reached a predetermined amount, and calculate an amount of feed of an oxygen to the catalyst during the lean air-fuel ratio control and end the lean air-fuel ratio control when the amount of feed of the oxygen has reached a predetermined amount.

* * * * *